(12) United States Patent
Chuang et al.

(10) Patent No.: US 8,648,931 B2
(45) Date of Patent: Feb. 11, 2014

(54) SYSTEMS AND METHODS FOR CAPTURING IMAGES OF OBJECTS

(75) Inventors: Cheng Te Chuang, Hsinchu (TW);
Yu-Chung Chang, Taipei (TW);
Cheng-Che Chen, Banciau (TW)

(73) Assignee: Mediatek Inc., Hsin-Chu (TW)

( * ) Notice: Subject to any disclaimer, the term of this patent is extended or adjusted under 35 U.S.C. 154(b) by 160 days.

(21) Appl. No.: 13/043,753

(22) Filed: Mar. 9, 2011

(65) Prior Publication Data

US 2011/0157421 A1    Jun. 30, 2011

Related U.S. Application Data

(62) Division of application No. 11/736,655, filed on Apr. 18, 2007, now abandoned.

(60) Provisional application No. 60/806,011, filed on Jun. 28, 2006.

(51) Int. Cl.
*H04N 5/76* (2006.01)
*H04N 5/228* (2006.01)

(52) U.S. Cl.
USPC .................. 348/231.3; 348/222.1

(58) Field of Classification Search
USPC ............... 348/231.2, 231.3, 222.1
See application file for complete search history.

(56) References Cited

U.S. PATENT DOCUMENTS

| | | | |
|---|---|---|---|
| 6,148,149 A * | 11/2000 | Kagle | 396/50 |
| 6,262,769 B1 * | 7/2001 | Anderson et al. | 348/333.1 |
| 6,473,123 B1 | 10/2002 | Anderson | |
| 6,597,817 B1 | 7/2003 | Silverbrook | |
| 6,751,473 B1 * | 6/2004 | Goyal et al. | 455/556.1 |
| 7,054,552 B2 | 5/2006 | Konttinen | |
| 7,148,911 B1 * | 12/2006 | Mitsui et al. | 348/14.01 |
| 7,532,235 B2 | 5/2009 | Wang | |
| 7,554,578 B2 | 6/2009 | Molgaard | |
| 2003/0163623 A1 * | 8/2003 | Yeung | 710/300 |
| 2004/0174430 A1 * | 9/2004 | Sawahara et al. | 348/14.02 |
| 2004/0185878 A1 | 9/2004 | Woo | |
| 2004/0239792 A1 * | 12/2004 | Shibutani et al. | 348/333.12 |
| 2005/0104976 A1 * | 5/2005 | Currans | 348/231.5 |
| 2005/0168583 A1 | 8/2005 | Thomason | |
| 2005/0286888 A1 * | 12/2005 | Konttinen | 396/374 |
| 2006/0033819 A1 * | 2/2006 | Ozaki et al. | 348/208.99 |
| 2006/0221351 A1 | 10/2006 | Yu et al. | |
| 2007/0182861 A1 * | 8/2007 | Luo et al. | 348/700 |
| 2008/0002963 A1 * | 1/2008 | Chuang et al. | 396/310 |
| 2010/0253825 A1 * | 10/2010 | Horie | 348/333.01 |

FOREIGN PATENT DOCUMENTS

CN    1473427    2/2004

OTHER PUBLICATIONS

Chinese language office action dated Jul. 11, 2008.

* cited by examiner

*Primary Examiner* — Lin Ye
*Assistant Examiner* — Amy Hsu
(74) *Attorney, Agent, or Firm* — McClure, Qualey & Rodack, LLP

(57) ABSTRACT

A method for generating an image object, performed by a mobile electronic device, comprises the following steps. The mobile electronic device comprises multiple shutter objects, and each shutter object corresponds to an orientation type. A signal generated by one of the shutter objects is detected. A orientation type is determined according to the shutter object generating the signal. The image object with the determined orientation type is stored.

14 Claims, 46 Drawing Sheets

# SYSTEMS AND METHODS FOR CAPTURING IMAGES OF OBJECTS

CROSS-REFERENCE TO RELATED APPLICATIONS

This application is a Divisional of pending U.S. patent application Ser. No. 11/736,655, filed Apr. 18, 2007, and entitled "Systems and Methods for Capturing Images of Objects," which claims the benefit of U.S. provisional application entitled "SYSTEMS AND METHODS FOR CAPTURING IMAGES OF OBJECTS", Ser. No. 60/806,011, filed Jun. 28, 2006.

BACKGROUND

The invention relates to digital image generation, and more particularly, to systems and methods for determining image orientations when capturing focused objects.

Mobile electronic devices such as mobile phones, personal digital assistants (PDAs) or similar, are typically equipped with embedded camera modules containing lenses, image sensor modules, image signal processors (ISPs) and others, to capture images of objects such as still images or video frames corresponding to focused objects (e.g. people, animals, flowers, mountain, stones or similar). The mobile electronic device may be held vertically or horizontally for focusing on objects to be captured. Mobile electronic devices are typically equipped with gyro sensors to detect orientation, in which the mobile electronic device is held, such as vertical or horizontal, thus, hardware cost is increased.

SUMMARY

Methods for capturing images of objects are provided. An embodiment of a method for generating an image object, performed by a mobile electronic device, comprises the following steps. The mobile electronic device comprises a first shutter object and a second shutter object. A signal is detected. It is determined whether the signal is generated by the first shutter object or the second shutter object. A first orientation type is determined when the signal is generated by the first shutter object. A second orientation type is determined when the signal is generated by the second shutter object. The image object with the determined orientation type is stored.

Systems for capturing images of objects are provided. An embodiment of a system comprises a first shutter object, a second shutter object and a processor coupled thereto. The processor coupling to the first and second shutter objects, detects a signal, determining whether the signal is generated by the first shutter object or the second shutter object, determines a first orientation type when the signal is generated by the first shutter object, determines a second orientation type when the signal is generated by the second shutter object, and stores the image object with the determined orientation type.

The image object is to be displayed in response to the stored orientation type.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
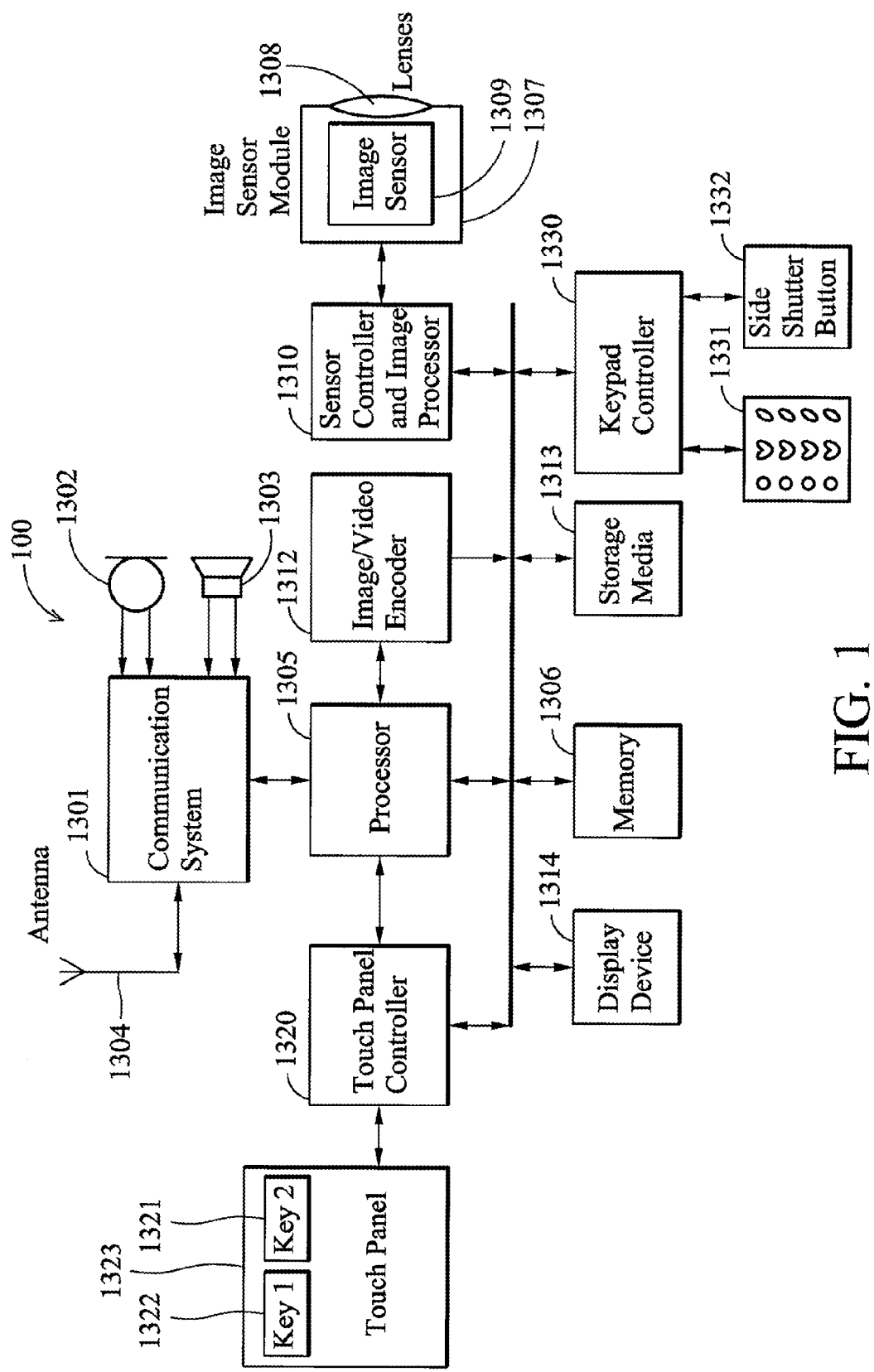
FIG. 1 is a diagram of a hardware environment applicable to a mobile electronic device.

Methods for capturing images of objects employed in mobile electronic devices such as mobile phones, PDAs and the like, are provided. FIG. 1 is a diagram of a hardware environment applicable to a mobile electronic device 100 mainly comprising a communication system 1301, a microphone 1302, a speaker 1303, an antenna 1304, a processor 1305, memory 1306, an image sensor module 1307, lens 1308, an image sensor 1309, a sensor controller and image processor 1310, an image encoder 1312, a touch panel controller 1320, and a key pad controller 1330. The communication system 1301 communicates with other remote mobile electronic devices via the antenna 1304 when connecting to a cellular network, such as global system for mobile communications (GSM), general packet radio service (GPRS), enhanced data rates for global evolution (EDGE), code division multiple access (CDMA), wideband code division multiple access (WCDMA) or circuit switched data (CSD) system or similar. The processor 1305 connects to the image encoder 1312, touch panel controller 1320, display device 1314, memory 1306, storage media 1313 and key pad controller 1330 via various bus architectures.

The image sensor module 1307 containing lenses 1308 and the image sensor 1309, as well as the sensor controller and image processor 1310 and image encoder 1312 provide image object generating capability. The image sensor module 1307 may contain charge coupled device (CCD) image sensors, complementary metal oxide semiconductor (CMOS) image sensors or similar to record the intensity of light as variable charges. In order to convert the content output from the image sensor module 1307 to a digital format, the sensor controller and image processor 1310 quantifies the variable charge into a discrete color value. A bitmap image contains a plurality of pixel data quantified by the sensor controller and image processor 1310 at a given resolution such as 640×480, 1024×768 and so on. The quantified bitmap images may be further converted into a well-known format such as joint photographic experts group (JPEG), graphics interchange format (GIF) or similar, by the image encoder 1312 to generate multiple compressed still images such as a JPEG or GIF images or similar. The image encoder 1312 may be a video encoder to compress and organize a series of the quantified bitmap images into a series of video frames such as MPEG-1, MPEG-2, MPEG-4, H.263 or H.264 I-, P- and B-frames. The still images and/or video frames generated by the image encoder 1312 may be stored in memory 1306 such as dynamic random access memory (DRAM), synchronous DRAM (SDRAM), flash memory or similar, or the storage media 1313 such as a compact flash (CF), memory stick (MS), smart media (SM), or SD memory card or similar. The generated still images and/or video frames may be displayed on the display device 1314 such as a color super-twisted nematic (CSTN) display, a thin film transistor-liquid crystal display (TFT-LCD), an organic light-emitting diode (OLED) display or similar.

Figure 2:
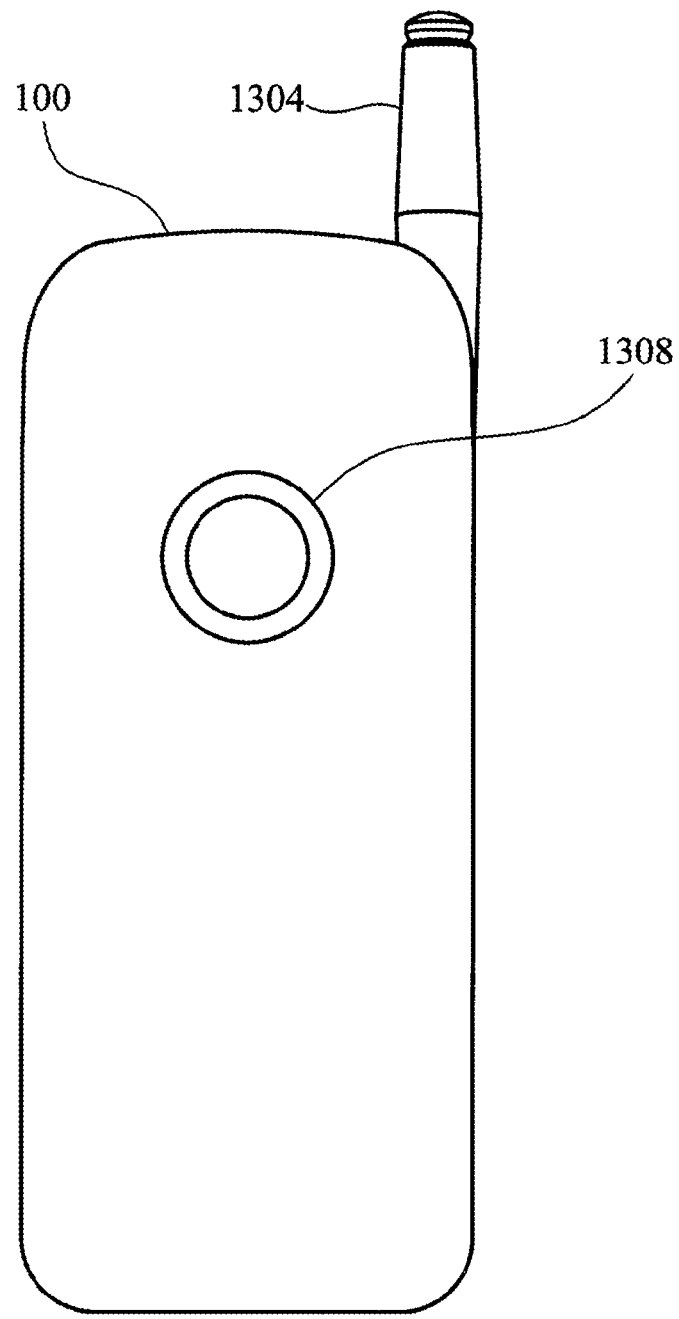
FIG. 2 shows the opposite side of an embodiment of a mobile electronic device.
Figure 3A:
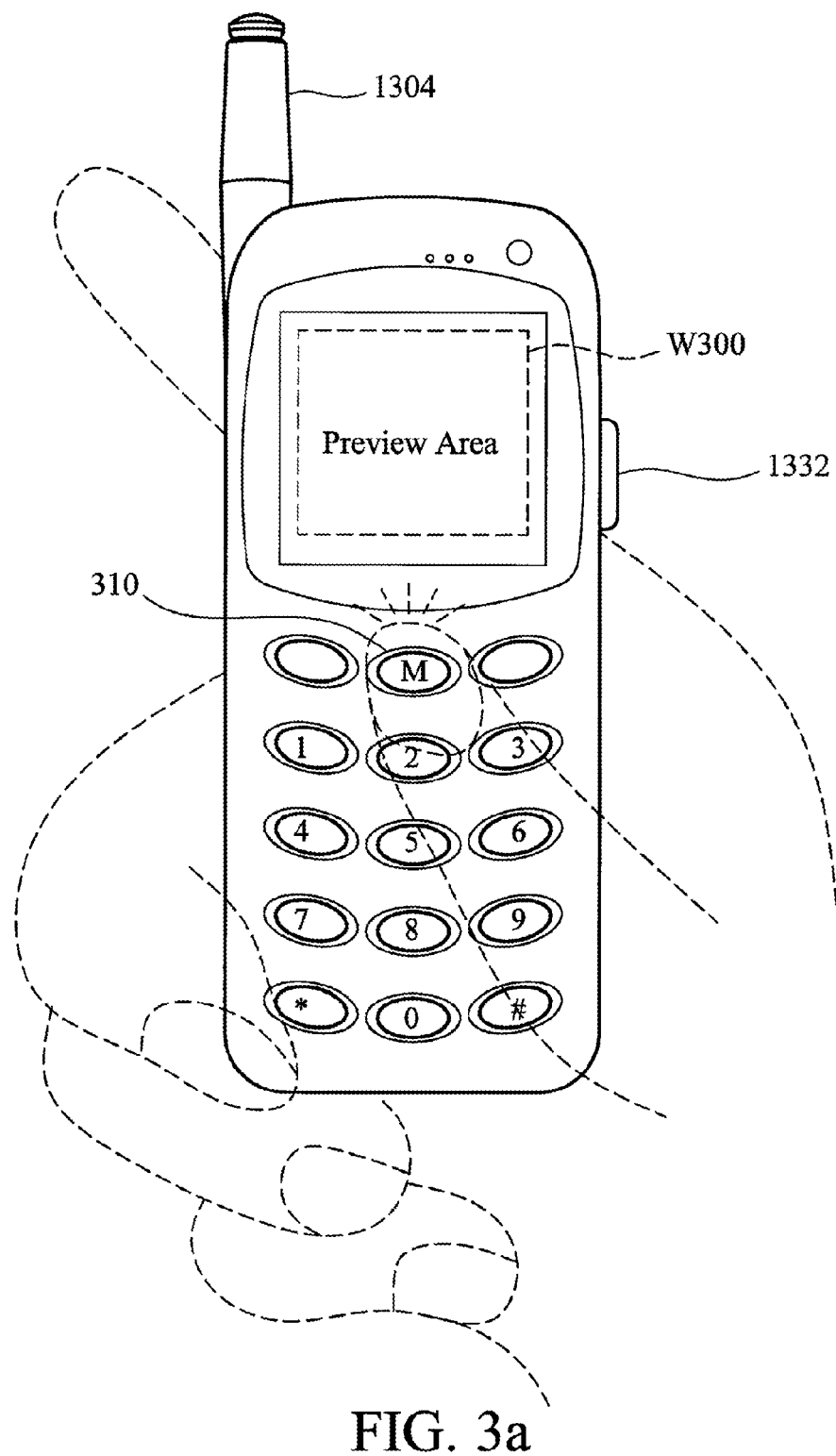
FIGS. 3a, 3b, 4a, 4b, 5a, 5b, 6a and 6b are schematic diagrams illustrating embodiments of shutter object placement.

Users may direct the mobile electronic device 100 to capture images of objects corresponding to focused objects by pressing soft keys 1321 and 1322 on a touch panel (FIG. 4*a*), hard keys on a key pad 1331 or side shutter button 1332 (FIG. 3*a*). After detecting a shutter or recording signal via the touch panel controller 1320 or the key pad controller 1330, which indicates a specific soft key 3121 or 1322 on a touch panel 1323, a hard key on the keypad 1331 or a shutter button 1332 is clicked or pressed, the processor 1305 may direct various camera mechanisms such as an autofocus motor, a shutter motor and/or a diaphragm motor (not shown), the sensor controller and image processor 1310 and image encoder 1312 to capture images of objects. FIG. 2 shows the opposite side of an embodiment of a mobile electronic device 100 containing the antenna 1304 and camera lens 1308. Objects brought into focus by the camera lens 1308 are captured and transformed into image objects upon detecting the described shutter or recording signal. Hard keys on the keypad 1331, the shutter button 1332 and soft keys 1321 and 1322 on the touch panel 1323 capable of generating the shutter or recording signals are referred to as shutter objects.

In some embodiments, at least two shutter objects for capturing images of objects such as still images and video frames are provided, and when detecting a shutter or recording signal, an orientation type corresponding to the shutter object generating the shutter or recording signal is determined and the generated image objects with the determined orientation type are stored, enabling the generated image object to be displayed in response to the determined orientation type.

Figure 3B:
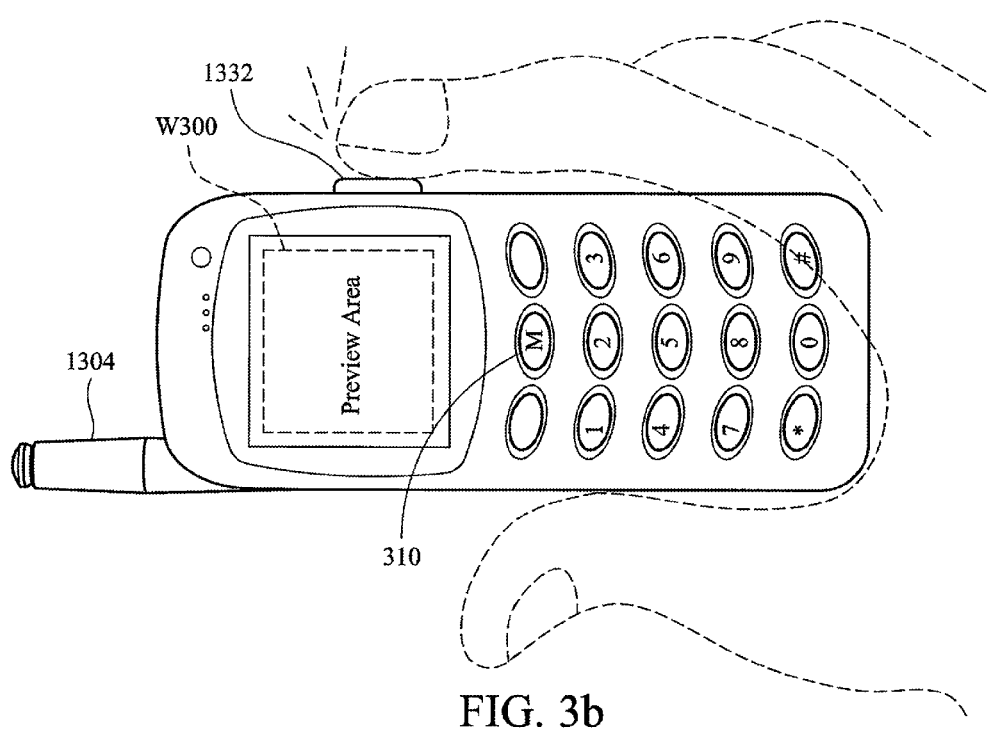

Several examples of shutter object placement are provided in the following. FIGS. 3*a* and 3*b* are schematic diagrams illustrating embodiments of shutter object placement. A hard shutter key 310 on a keypad (e.g. 1331 of FIG. 1) is disposed on the front panel of a mobile electronic device, and a shutter button 1332 is disposed on one lateral side (e.g. the right lateral side) of the mobile electronic device. A display device (e.g. 1314 of FIG. 1) or a touch panel (e.g. 1323 of FIG. 1) may continuously display images generated by an image sensor module (e.g. 1307 of FIG. 1) in preview area W300, facilitating focus on certain objects. Referring to FIG. 3*a*, a user may hold the mobile electronic device vertically to focus on certain objects to be captured, and, when pressing the hard shutter key 310 with a thumb, an image object corresponding to the focused objects is generated and stored in memory (e.g. 1306 of FIG. 1) or storage media (e.g. 1313 of FIG. 1). Referring to FIG. 3*b*, a user may hold the mobile electronic device horizontally to focus on certain objects, and, when pressing the shutter button 1332 with a forefinger, an image object corresponding to the focused objects is generated and stored.

Figure 4A:
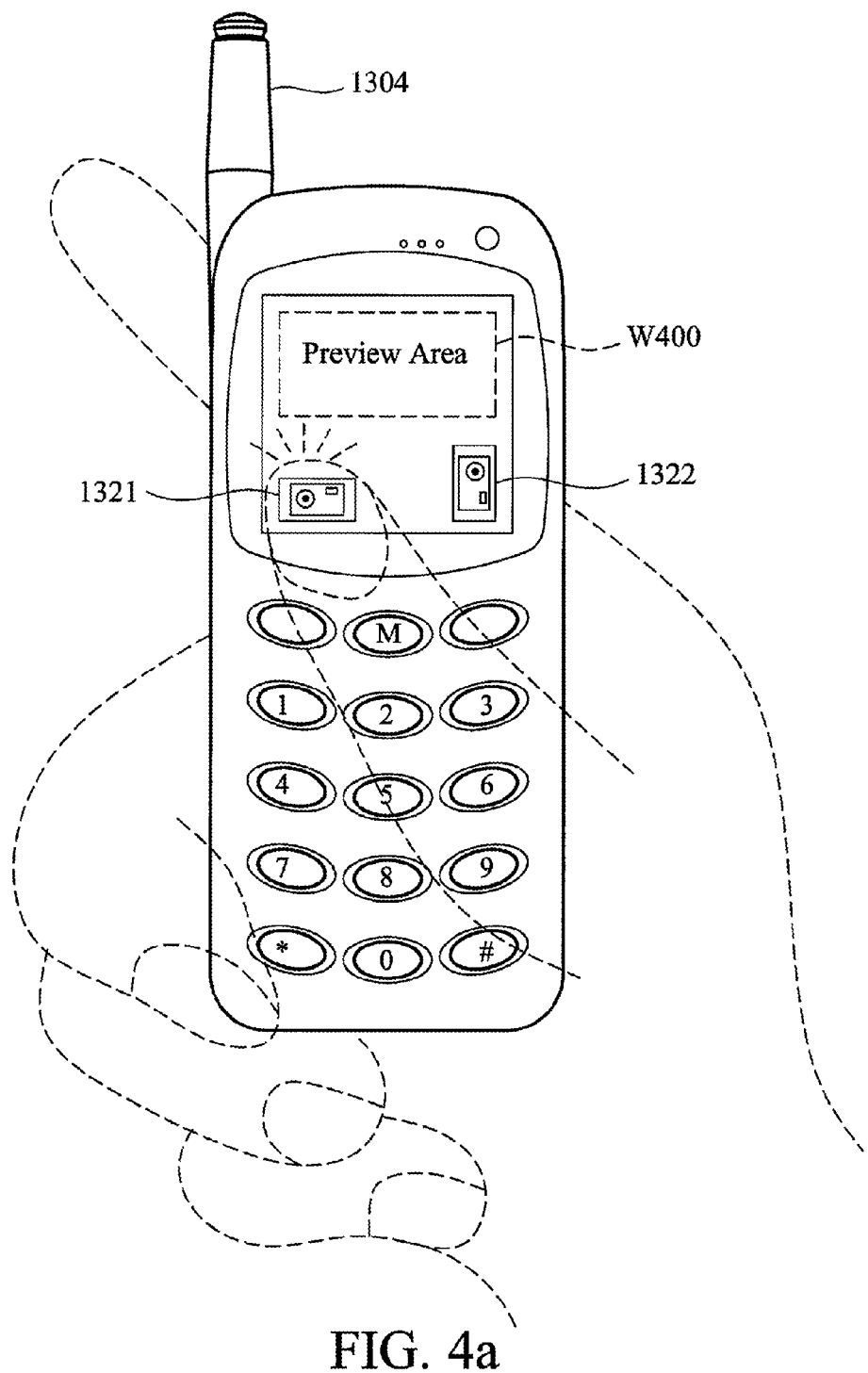
Figure 4B:
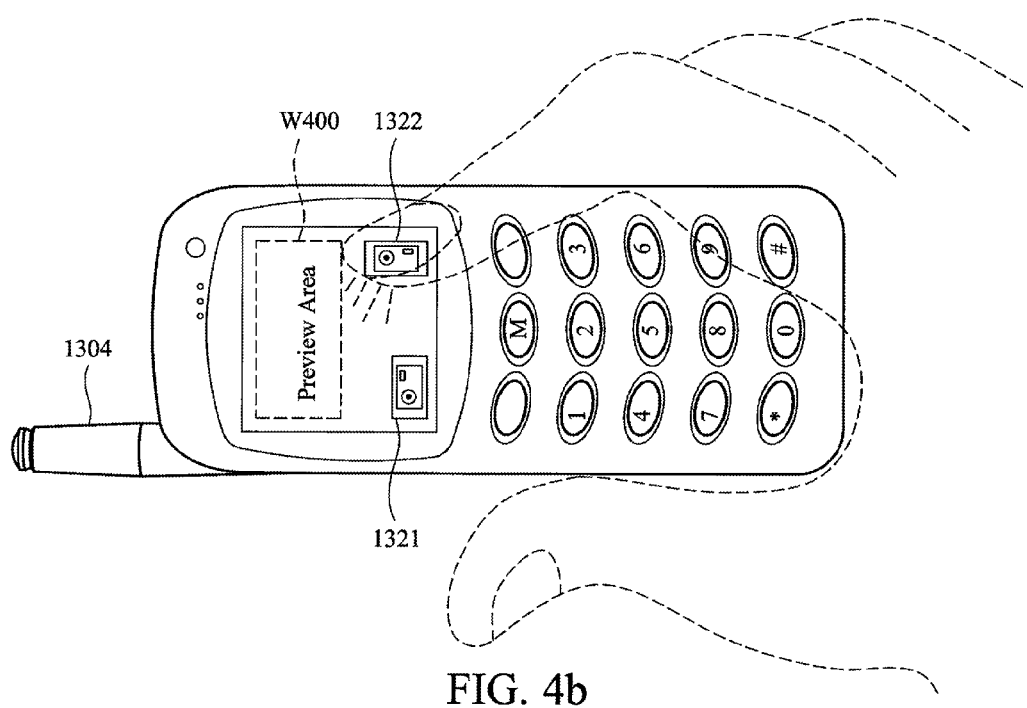

FIGS. 4*a* and 4*b* are schematic diagrams illustrating embodiments of shutter object placement. Two soft keys 1321 and 1322 are displayed on a touch panel (e.g. 1323 of FIG. 1) of a mobile electronic device. The soft key 1321 presents an icon indicating that it is preferably to click the soft key 1321 to capture an image of the focused objects when the mobile electronic device is vertically oriented. Alternatively, the soft key 1322 presents an icon indicating that it is preferably to click the soft key 1322 to capture an image of the focused objects when the mobile electronic device is horizontally oriented. The touch panel may continuously display images generated by an image sensor module (e.g. 1307 of FIG. 1) in preview area W400, facilitating focus on certain objects. Referring to FIG. 4*a*, a user may hold the mobile electronic device vertically to focus on certain objects to be captured, and when clicking the soft key 1321 with a thumb, an image object corresponding to the focused objects is generated and stored in memory (e.g. 1306 of FIG. 1) or storage media (e.g. 1313 of FIG. 1). Referring to FIG. 3*b*, a user may hold the mobile electronic device horizontally to focus on certain objects, and when clicking the soft key 1322 with a forefinger, an image object corresponding to the focused objects is generated and stored.

Figure 5A:
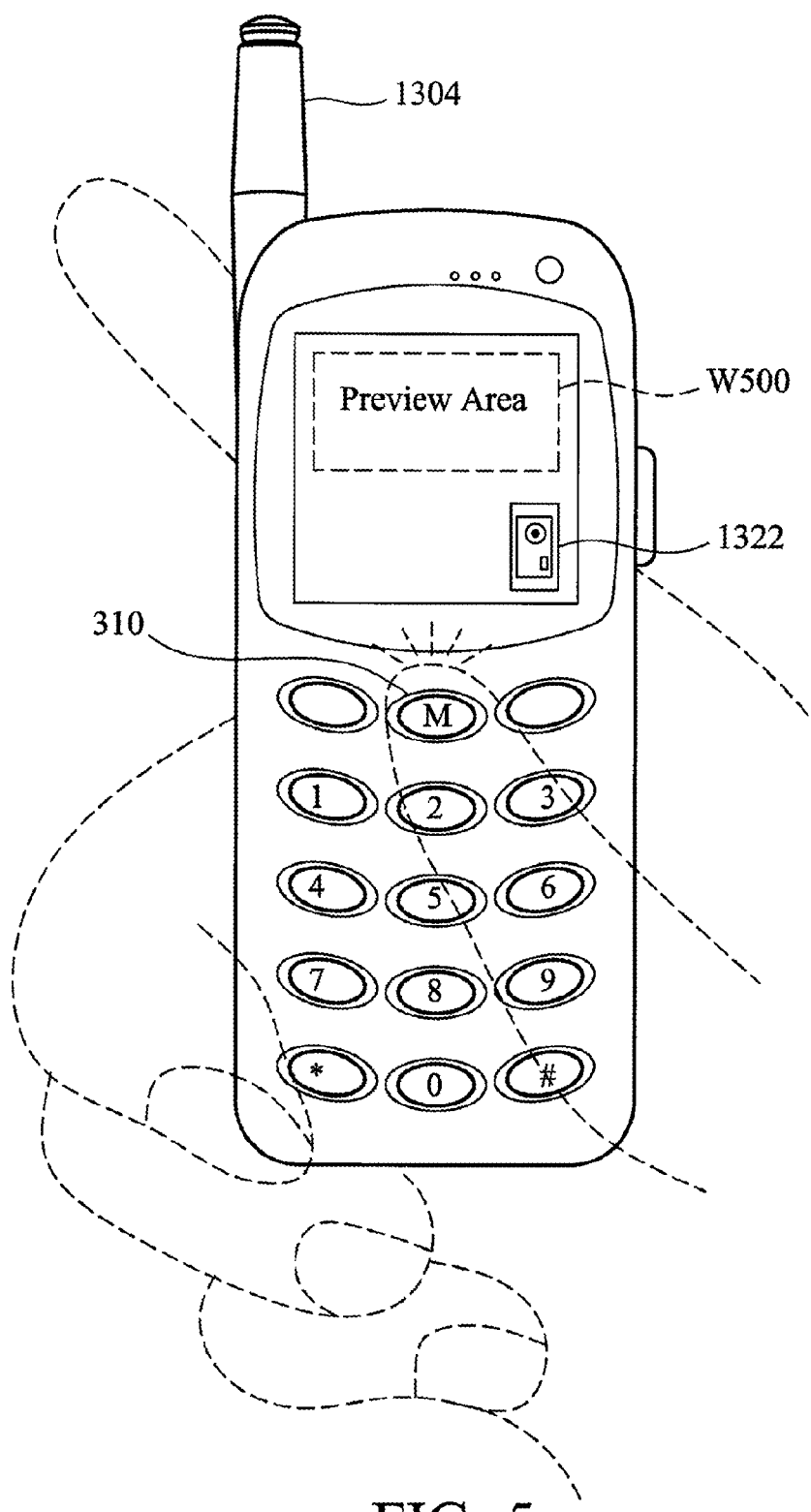
Figure 5B:
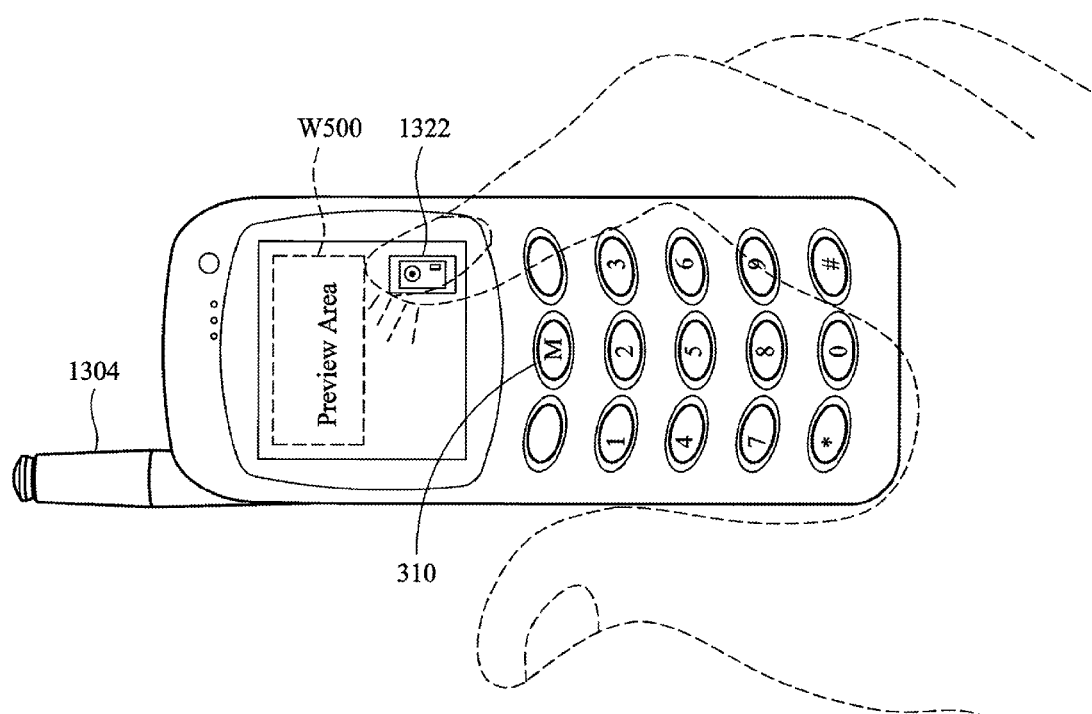

FIGS. 5*a* and 5*b* are schematic diagrams illustrating an embodiment of shutter object placement. The described hard shutter key 310 on a keypad (e.g. 1331 of FIG. 1) is disposed on the front panel of a mobile electronic device, and the described soft key 1322 is displayed on a touch panel (e.g. 1323 of FIG. 1) of a mobile electronic device. The touch panel may continuously display images generated by an image sensor module (e.g. 1307 of FIG. 1) in preview area W300, facilitating focus on certain objects. Referring to FIG. 5*a*, a user may hold the mobile electronic device vertically to focus on certain objects to be captured, and when pressing the hard shutter key 310 with a thumb, an image object corresponding to the focused objects is generated and stored. Referring to FIG. 5*b*, a user may hold the mobile electronic device horizontally to focus on certain objects, and, when clicking the soft key 1322 with a forefinger, an image object corresponding to the focused objects is generated and stored.

Figure 6A:
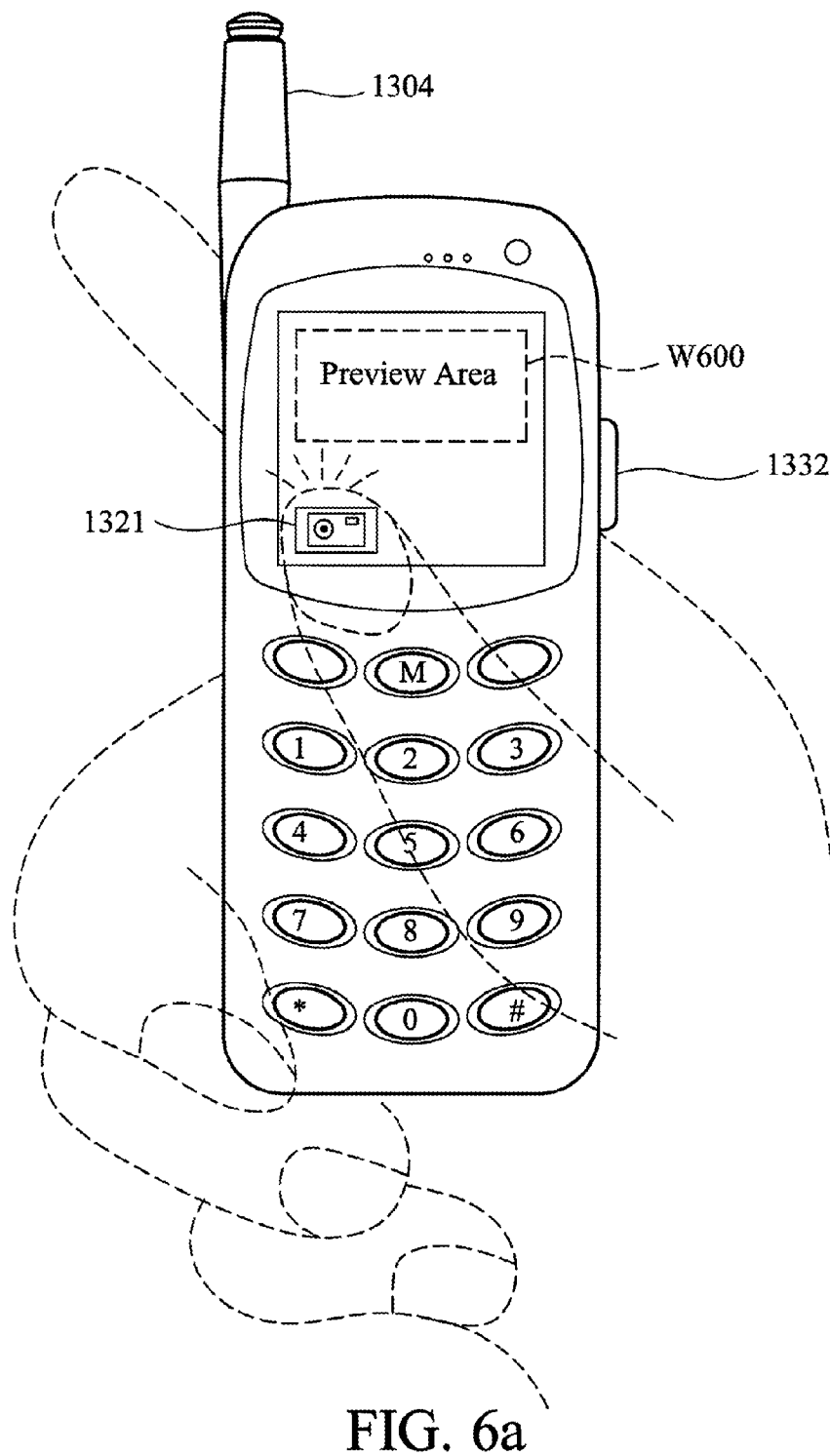
Figure 6B:
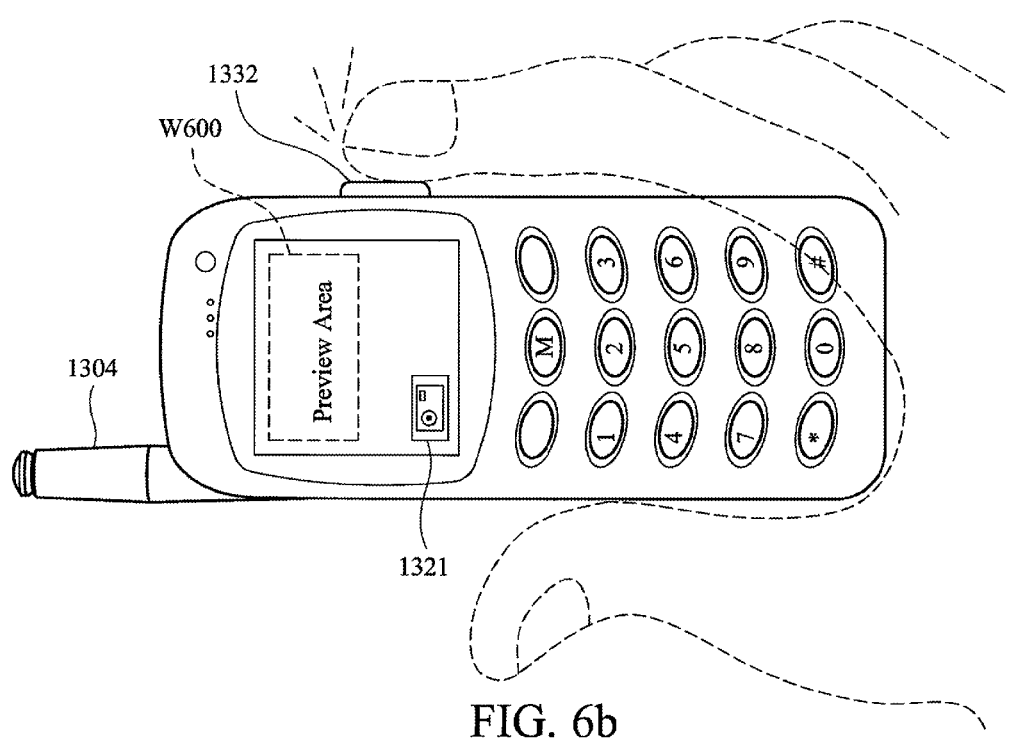

FIGS. 6a and 6b are schematic diagrams illustrating an embodiment of shutter object placement. The described soft key 1321 is displayed on a touch panel (e.g. 1323 of FIG. 1) of a mobile electronic device, and the described shutter button 1322 is disposed on one lateral side (e.g. the right lateral side) of the mobile electronic device. The touch panel may continuously display images generated by an image sensor module (e.g. 1307 of FIG. 1) in preview area W600, facilitating focus on certain objects. Referring to FIG. 6a, a user may hold the mobile electronic device vertically to focus on certain objects to be captured, and when clicking the soft key 1321 with a thumb, an image object corresponding to the focused objects is generated and stored. Referring to FIG. 6b, a user may hold the mobile electronic device horizontally to focus on certain objects, and when pressing the shutter button 1332 with a forefinger, an image object corresponding to the focused objects is generated and stored.

Figure 7A:
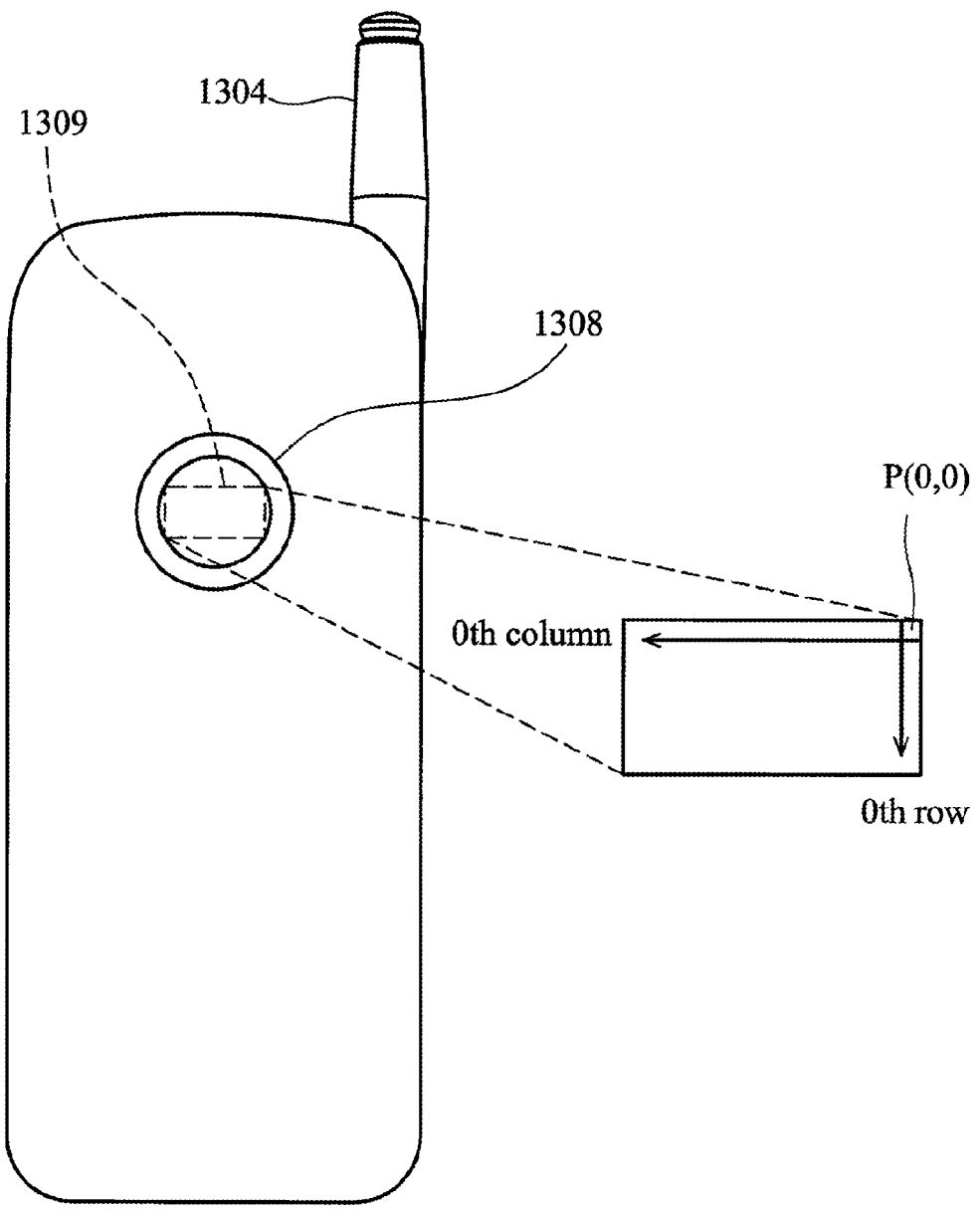
FIGS. 7a and 7b are diagrams of the opposite side of an embodiment of a mobile electronic device.
Figure 7B:
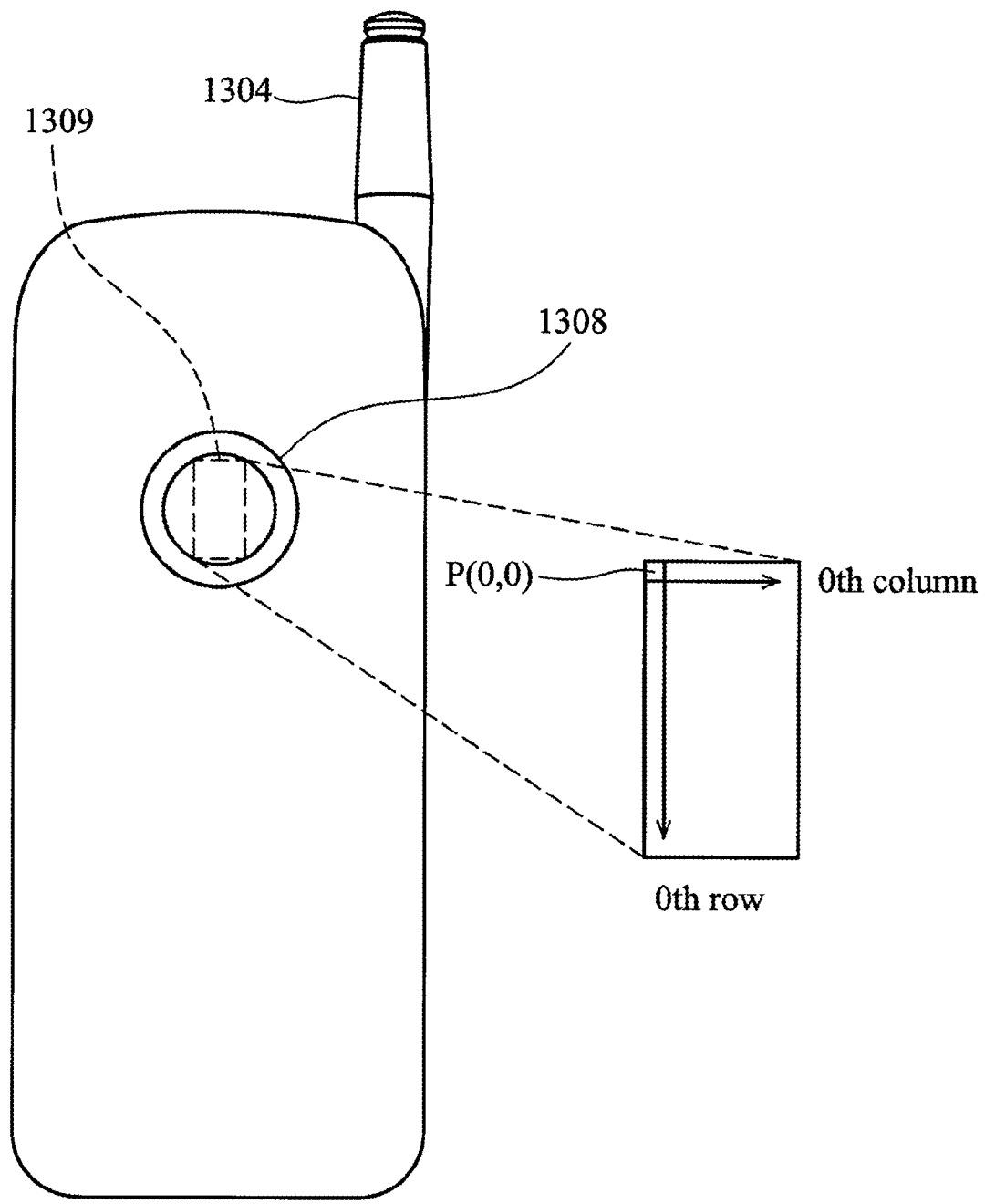

The image sensor may be placed in two ways. FIGS. 7a and 7b are diagrams of the opposite side of an embodiment of a mobile electronic device, illustrating placement of the image sensor in two aspects. The image sensor is typically an array of CMOS, CCD cells or similar. Referring to FIG. 7a, at least one long edge of the image sensor 1309 is placed parallel to at least one short edge of a mobile electronic device. Referring to FIG. 7b, at least one short edge of the image sensor 1309 is placed parallel to at least one short edge of a mobile electronic device. A cell P(0,0) is located in column 0 (i.e. the first column) of row 0 (i.e. the first row) of the image sensor. It is to be understood that image objects are generated by sequentially scanning the image sensor 1309 to retrieve and convert variable charges into discrete color values. For example, the scanning process, performed by a sensor controller and image processor (e.g. 1310 of FIG. 1), comprises scanning from the first column to the last column in a row. Upon reaching the last column in a row, the next row is scanned from the first column to the last column. The scanning process continues until the entire image sensor has been scanned and all color values have been acquired.

Figure 8:
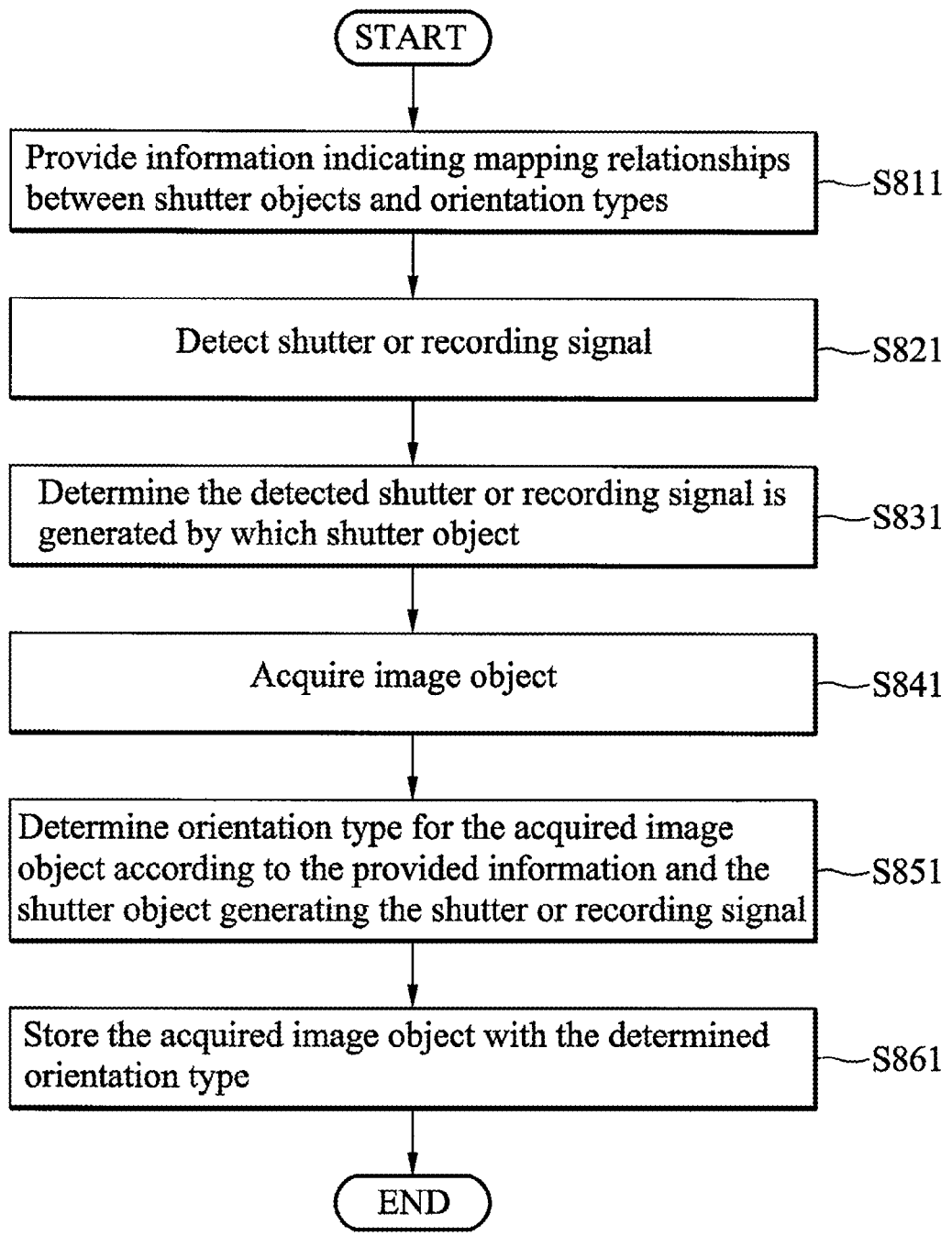
FIG. 8 is a flowchart illustrating an embodiment of a method for capturing images of objects.
Figure 9B:
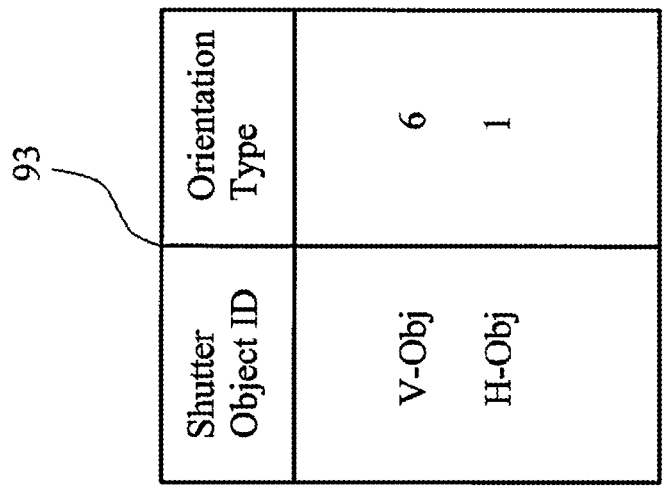
FIGS. 9a and 9b are diagrams respectively containing tables.
Figure 9A:
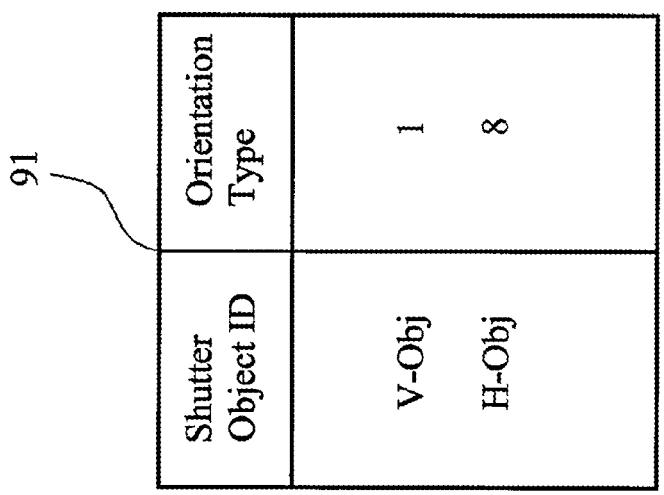

FIG. 8 is a flowchart illustrating an embodiment of a method for capturing images of objects, performed by a processor of a mobile electronic device (e.g. 1305 of FIG. 1). In step S811, information indicating mapping relationships between shutter objects and orientation types is provided. Such information may be stored in memory (e.g. 1306 of FIG. 1) or storage media (e.g. 131 of FIG. 1). FIGS. 9a and 9b are diagrams respectively containing tables 91 and 93. The table 91 describes information indicating mapping relationships when an image sensor is placed as shown in FIG. 7a, and, the table 93 describes information indicating mapping relationships when an image sensor is placed as shown in FIG. 7b. Wherein, "V-Obj" may identify a shutter object easily pressed or clicked with a thumb (e.g. 310 of FIG. 3a or FIG. 5a, or 1321 of FIG. 4a or FIG. 6a) when the mobile electronic is vertically oriented. "H-Obj" may identify a shutter object easily pressed or clicked with a forefinger (e.g. 1332 of FIG. 3b or FIG. 6b, or 1322 of FIG. 4b or FIG. 5b) when the mobile electronic is horizontally held. There are eight orientation types ranging from 1 to 8 can be assigned to one of "V-Obj" and "H-Obj". It is to be understood that all the pixel data (i.e. discrete color values) of the acquired still images and video frames are typically stored corresponding to the described scanning process. It is to be understood that tables 91 and 93 can be implemented in various data structures such as two-dimensional arrays or similar.

Figure 10A:
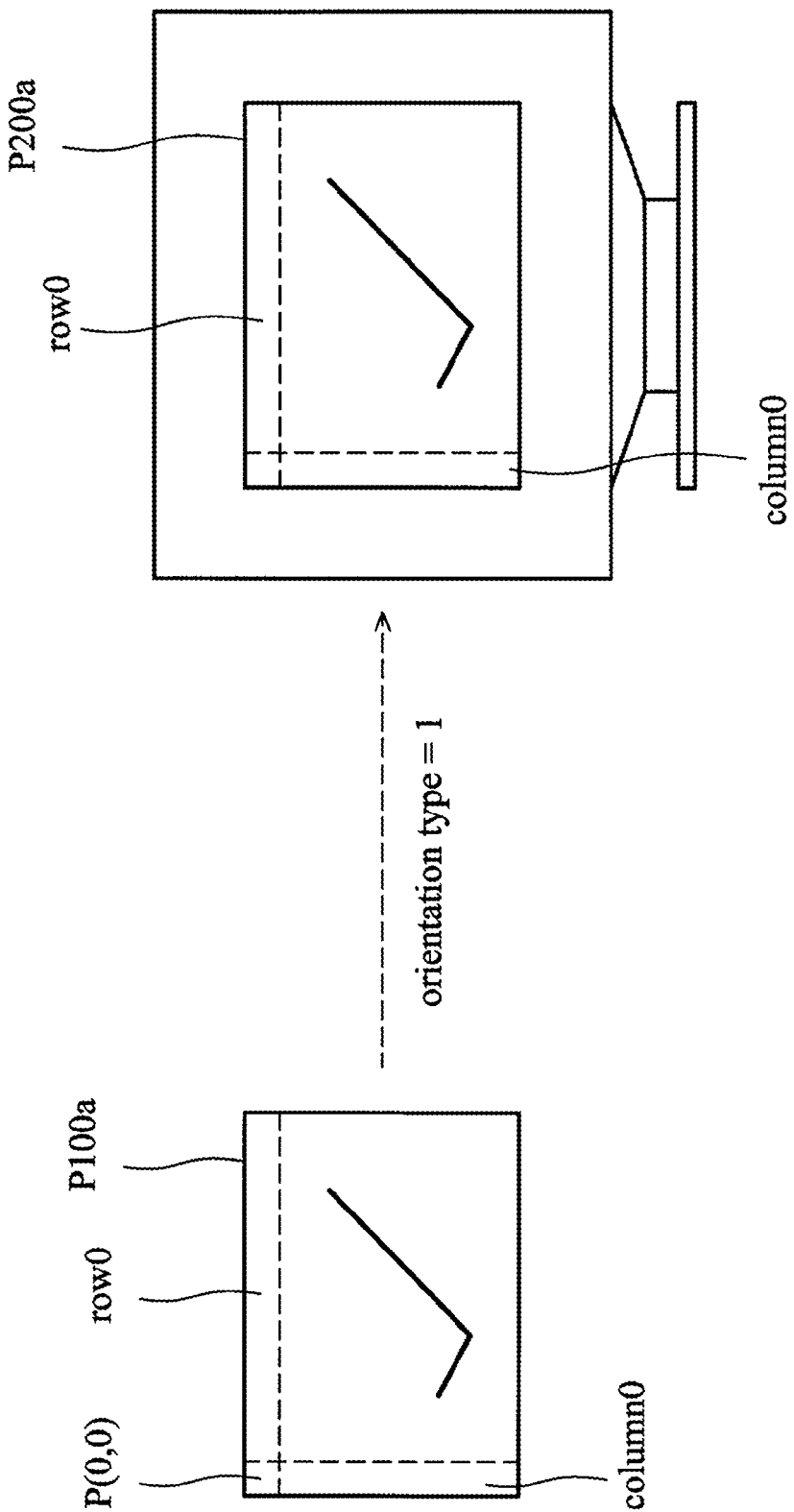
FIGS. 10a to 10h are diagrams illustrating mappings between the stored image objects and representations on a display device.
Figure 10B:
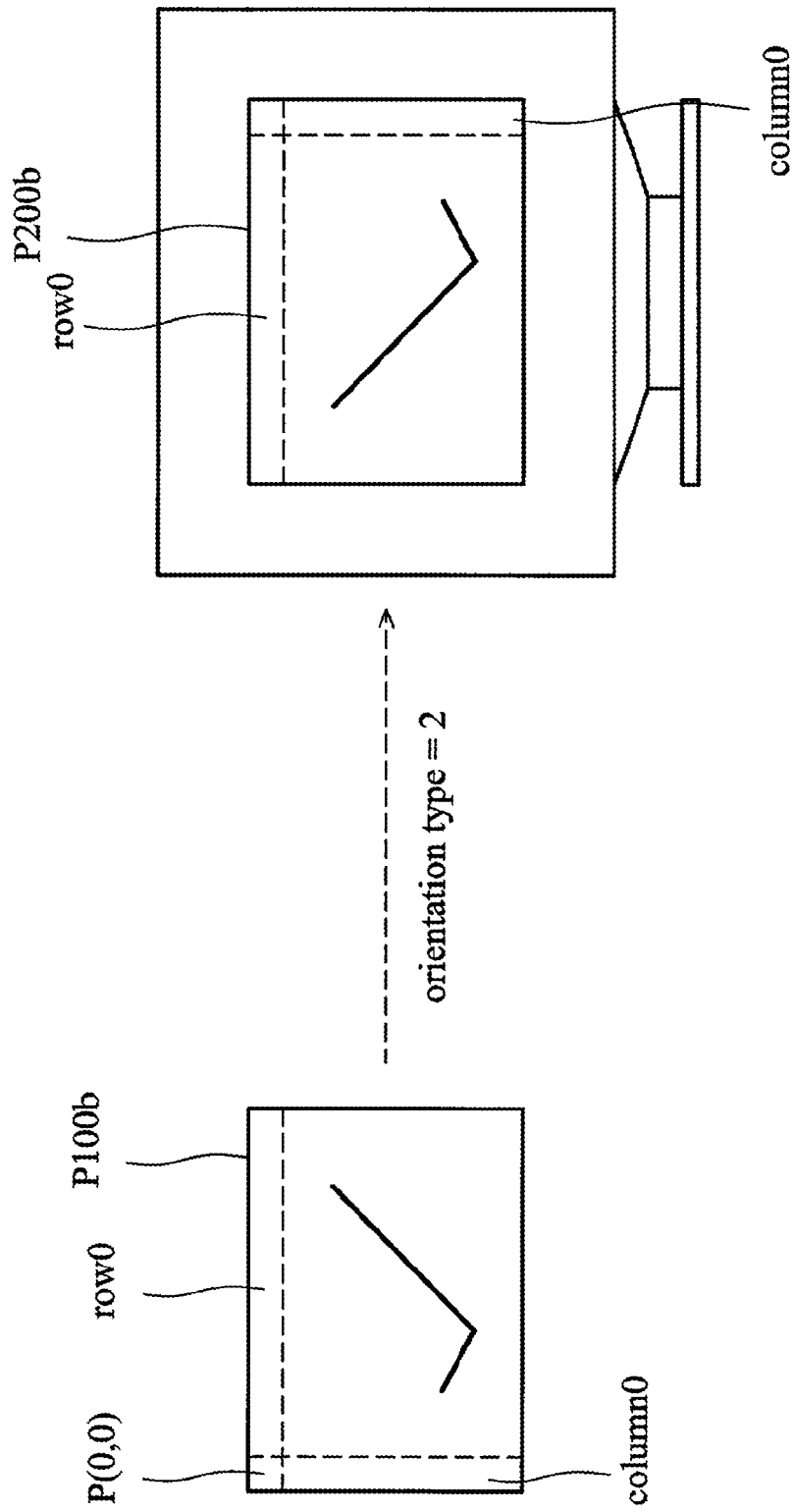
Figure 10C:
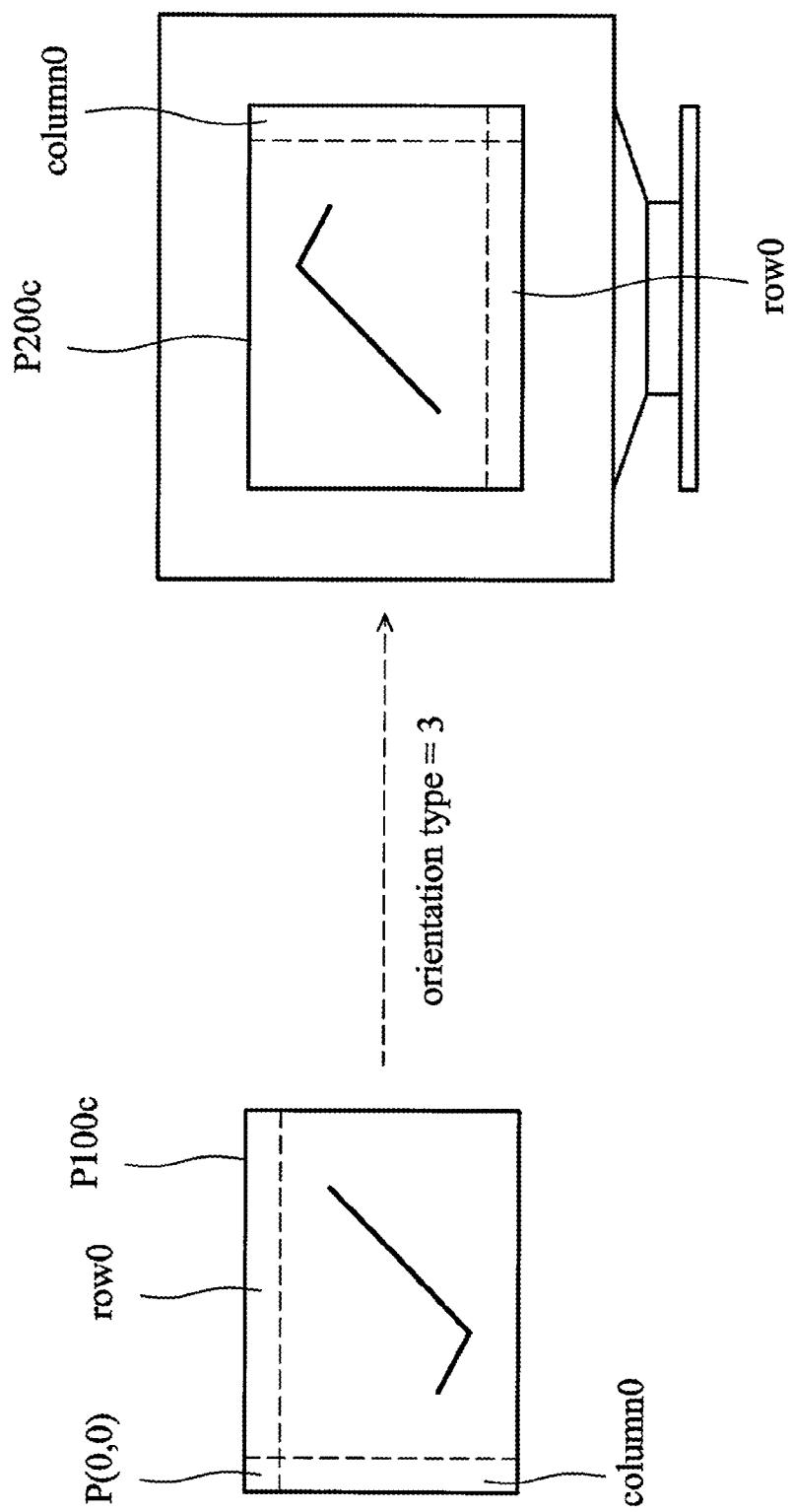
Figure 10D:
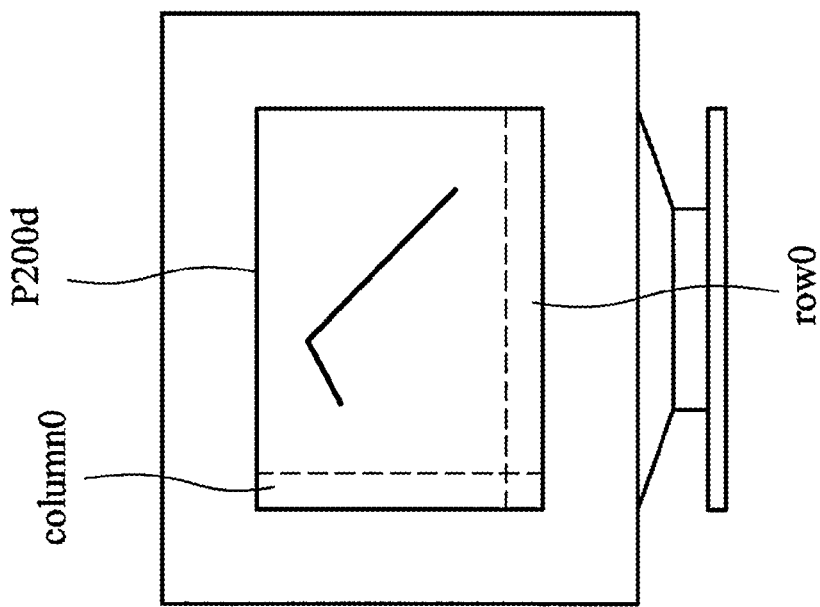
Figure 10D:
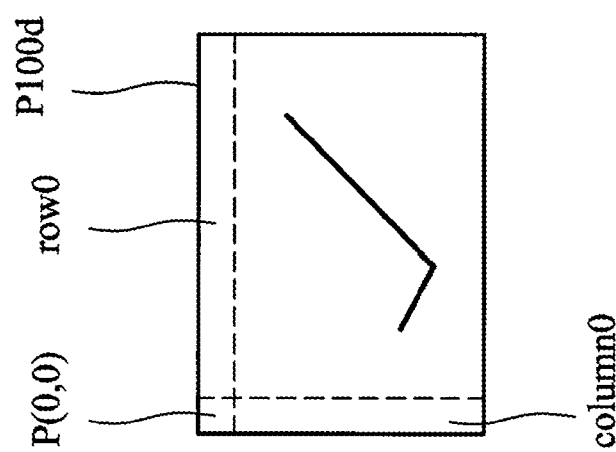
Figure 10E:
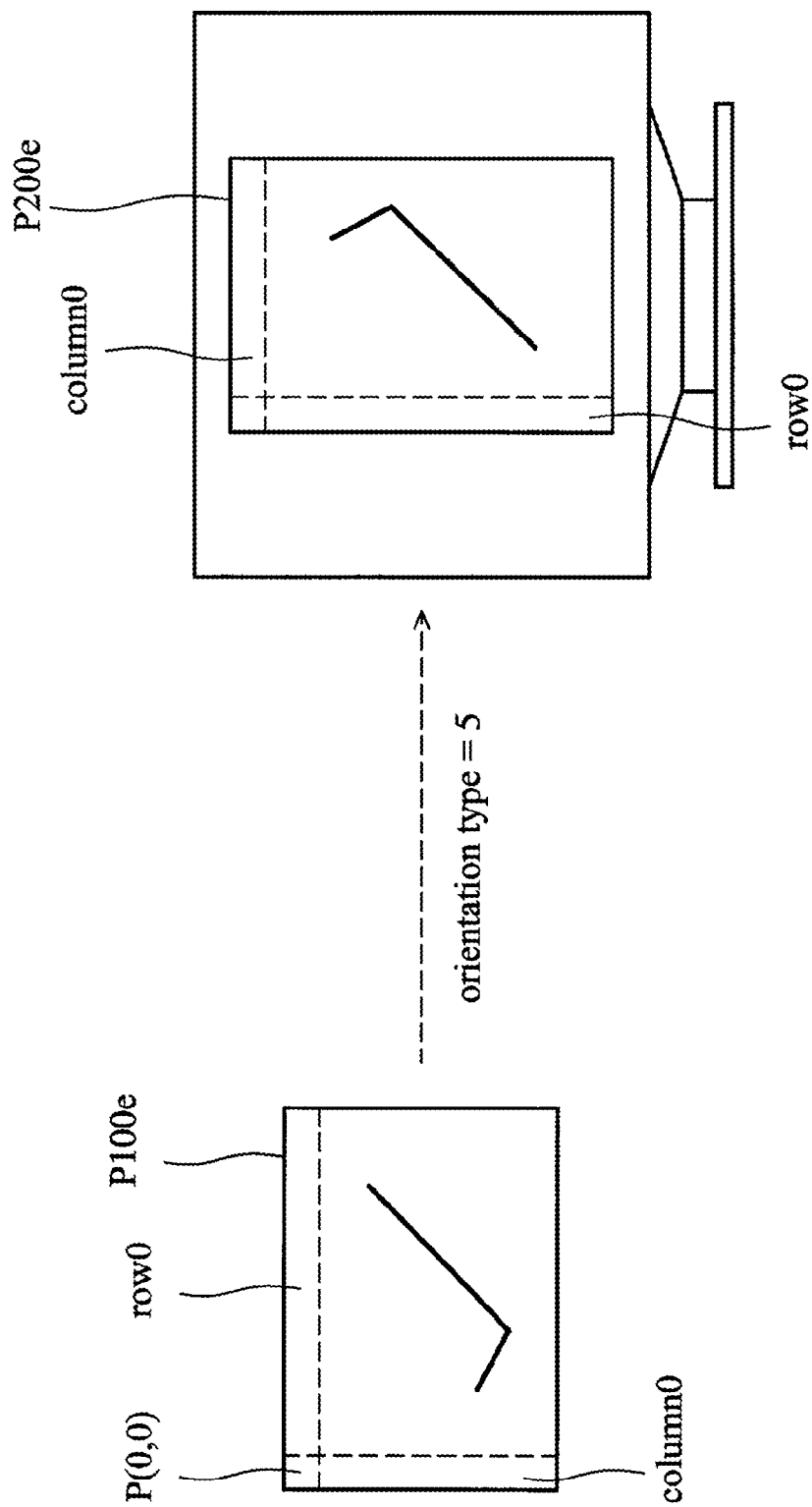
Figure 10F:
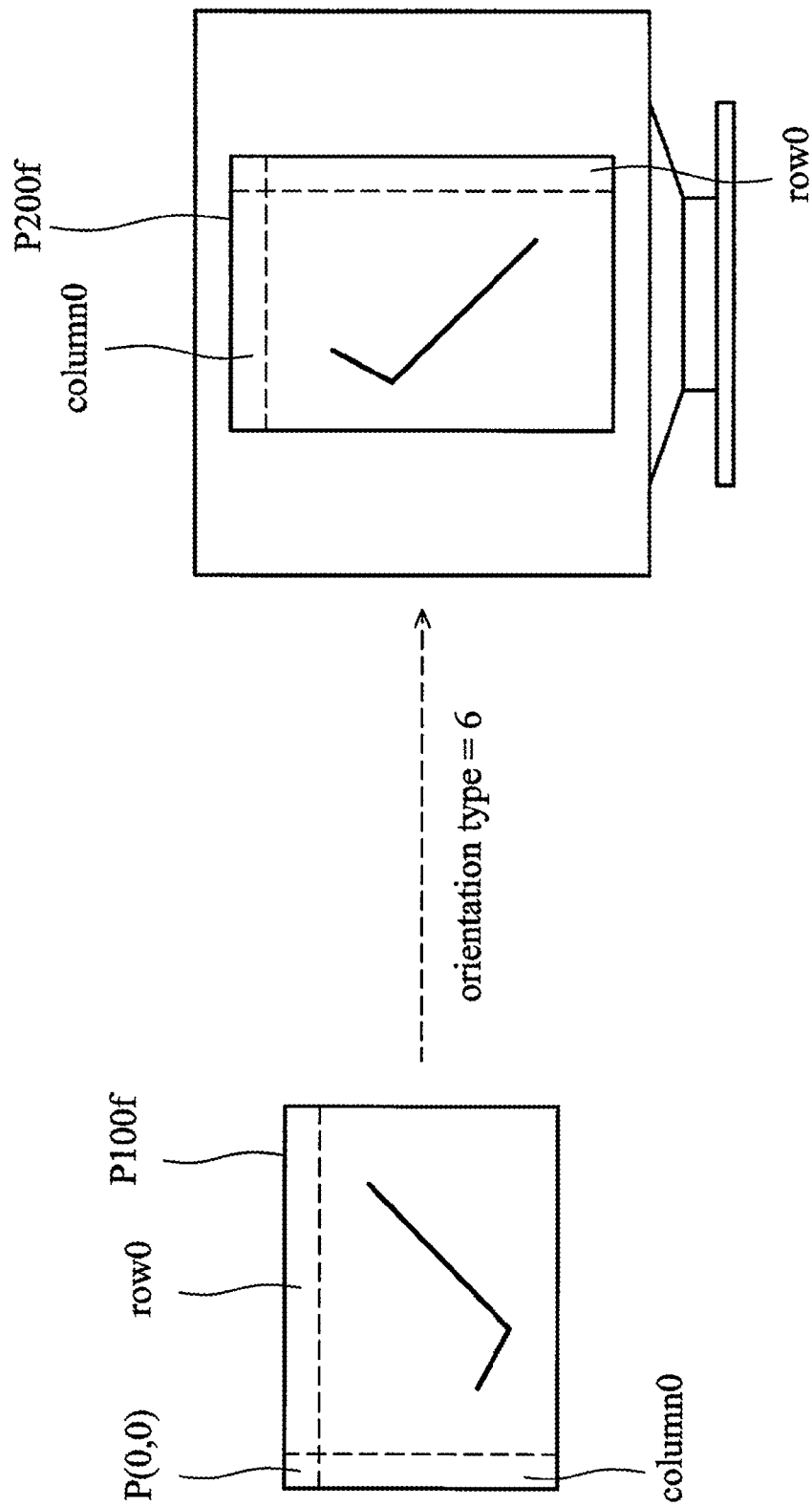
Figure 10G:
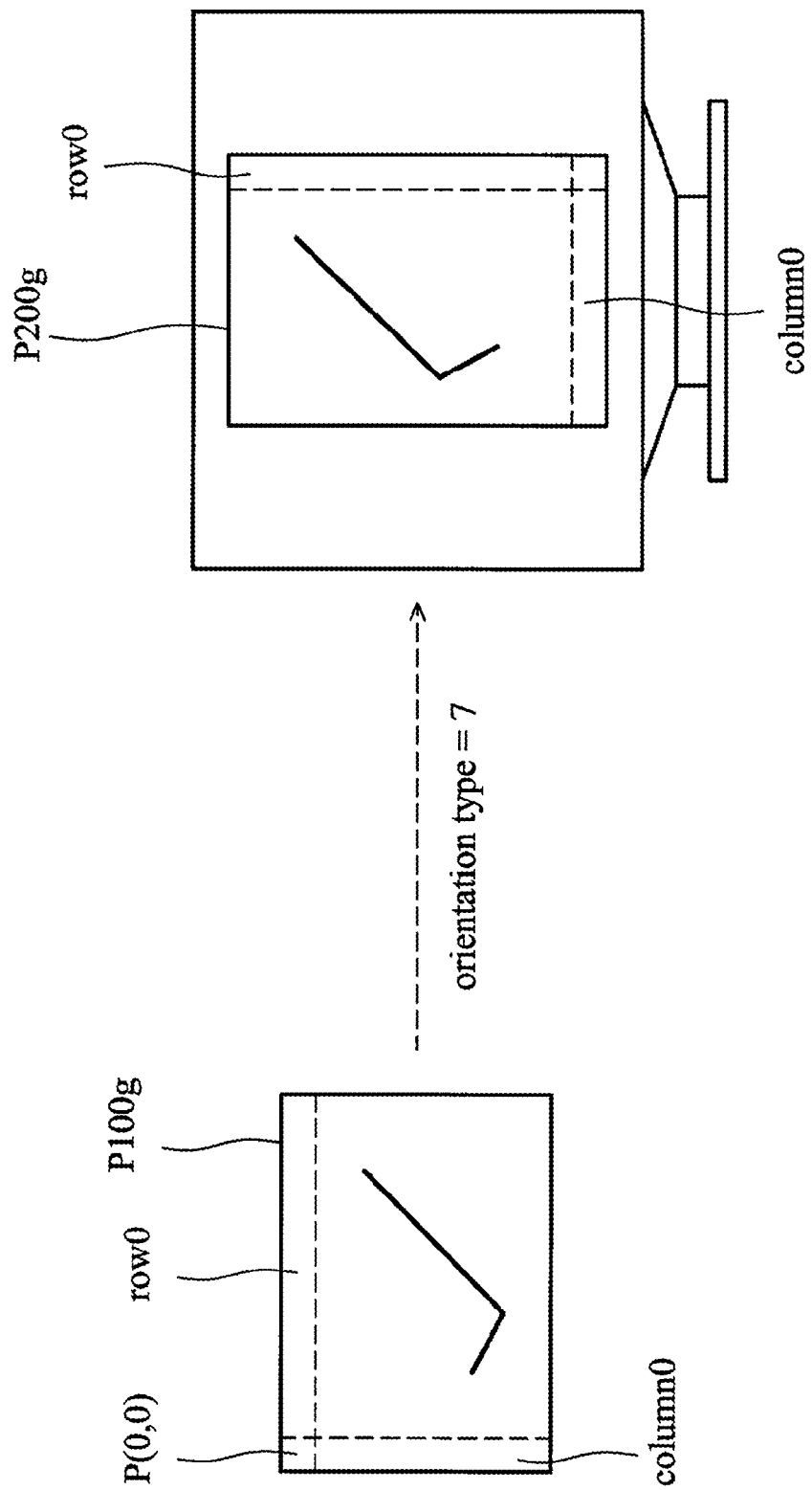
Figure 10H:
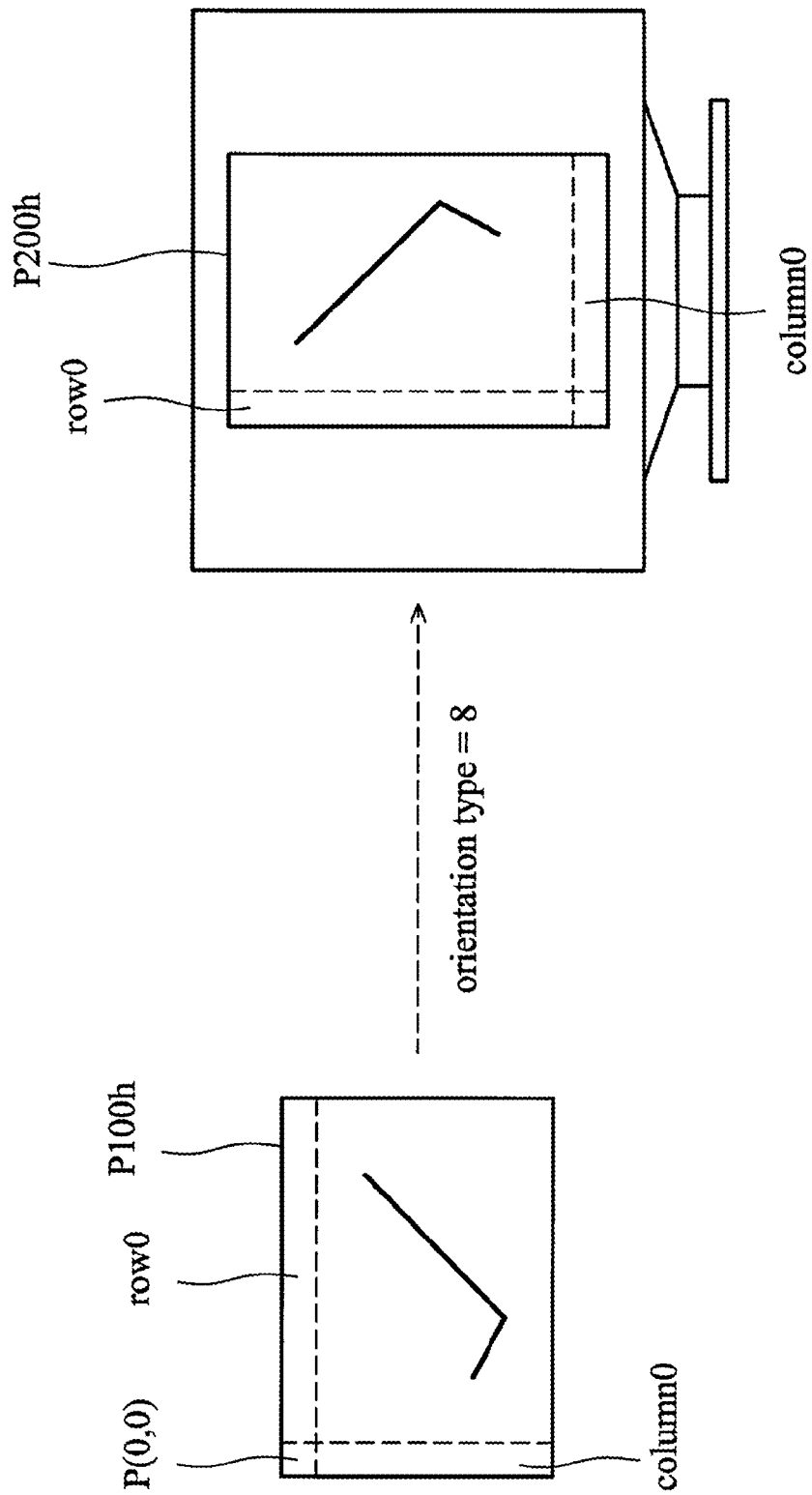

Each orientation type indicates mappings between the stored image objects and representations on a display device (e.g. 1314 of FIG. 1), a touch panel (e.g. 1323 of FIG. 1) or an external display such as a CRT monitor, a TFT-LCD display (not shown), a plasma display (not shown), an OLED display (not shown) or similar. FIGS. 10a to 10h are diagrams illustrating mappings between the stored image objects and representations on a display device. An orientation type equal to one indicates row 0 of a stored image/frame P100a is displayed at the top of a displayed image/frame P200a, and column 0 of the stored image/frame P100a is displayed at the left-hand side of the displayed image/frame P200a, the display result is as shown in FIG. 10a. An orientation type equal to two indicates row 0 of a stored image/frame P100b is displayed at the top of a displayed image/frame P200b, and column 0 of the stored image/frame P100b is displayed at the right-hand side of the displayed image/frame P200b, the display result is as shown in FIG. 10b. An orientation type equal to three indicates row 0 of a stored image/frame P100c is displayed at the bottom of a displayed image/frame P200c, and column 0 of the stored image/frame P100c is displayed at the right-hand side of the displayed image/frame P200c, the display result is as shown in FIG. 10c. An orientation type equal to four indicates row 0 of a stored image/frame P100d is displayed at the bottom of a displayed image/frame P200d, and column 0 of the stored image/frame P100d is displayed at the left-hand side of the displayed image/frame P200d, the display result is as shown in FIG. 10d. An orientation type equal to five indicates row 0 of a stored image/frame P100e is displayed at the left-hand side of a displayed image/frame P200e, and column 0 of the stored image/frame P100e is displayed at the top of the displayed image/frame P200e, the display result is as shown in FIG. 10e. An orientation type equal to six indicates row 0 of a stored image/frame P100f is displayed at the right-hand side of a displayed image/frame P200f, and column 0 of the stored image/frame P100f is displayed at the top of the displayed image/frame P200f, the display result is as shown in FIG. 10f. An orientation type equal to seven indicates row 0 of a stored image/frame P100g is displayed at the right-hand side of a displayed image/frame P200g, and column 0 of the stored image/frame P100g is displayed at the bottom of the displayed image/frame P200g, the display result is as shown in FIG. 10g. An orientation type equal to eight indicates row 0 of a stored image/frame P100h is displayed at the left-hand side of a displayed image/frame P200h, and column 0 of the stored image/frame P100h is displayed at the bottom of the displayed image/frame P200h, the display result is as shown in FIG. 10h. The details of utility of the provided information are to be described by referring to the following steps.

In step S821, a shutter or recording signal is detected. The shutter or recording signal may be generated by one of multiple shutter objects such as soft keys on a touch panel (e.g. 1321 of FIG. 4a, 4b, 6a or 6b, or 1322 of FIG. 4a, 4b, 5a or 5b), hard keys on a keypad (e.g. 310 of FIG. 3a, 3b, 5a or 5b), and a shutter button disposed on a lateral side (e.g. 1332 of FIG. 3a, 3b, 6a or 6b). The shutter signal will direct relevant electronic devices of the mobile electronic device to generate a still image. The recording signal will direct relevant electronic devices of the mobile electronic device to generate a series of video frames. In step S831, it is determined the detected shutter or recording signal is generated by which shutter object. In step S841, an image object is acquired via an image sensor module (e.g. 1307 of FIG. 1), a sensor controller and image processor (e.g. 1310 of FIG. 1) and/or an image encoder (e.g. 1312 of FIG. 1). In step S851, an orientation type for the acquired image object is determined according to the provided information and the shutter object generating the shutter or recording signal. For example, as an image sensor is placed as shown in FIG. 7a, according to the table 91 of FIG. 9a, the orientation type is determined to be one when the shutter or recording signal is generated by a shutter object identified by "V-Obj" (e.g. 310 of FIG. 3a, 1321 of FIG. 4a, 310 of FIG. 5a, or 1321 of FIG. 6a), otherwise, the orientation type is determined to be eight when the shutter or recording signal is generated by a shutter object identified by "H-Obj" (e.g. 1332 of FIG. 3b, 1322 of FIG. 4b, 1322 of FIG. 4a, or 1332 of FIG. 6b). In step S861, the acquired image object with the determined orientation type is stored in memory (e.g. 1306 of FIG. 1) or storage media (e.g. 1313 of FIG. 1). The determined orientation type may be stored in an orientation tag (0x112) of a still image header file compatible with the exchangeable image file format (EXIF) set forth by exchangeable image file format for digital still cameras: Exif Version 2.2 established in April, 2002. The determined orientation type following a proprietary identifier (e.g. "MTKO-RIT") may be stored in a user data (udat) box of an MPEG file set forth by ISO 14496-12 first edition on Feb. 1, 2004. It is to be understood that the pixel data arrangement for the stored still images or video frame is not changed when storing the orientation type in the orientation tag of a still image header file or the udat box of an MPEG file.

Figure 11:
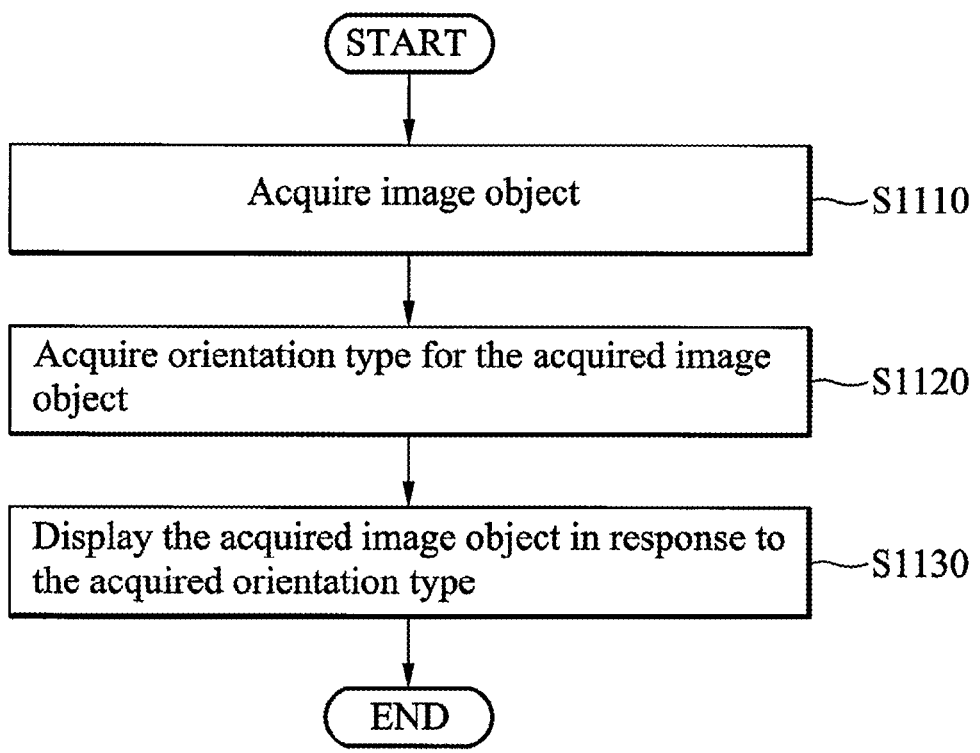
FIG. 11 is a flowchart illustrating an embodiment of a method for displaying image objects.

FIG. 11 is a flowchart illustrating an embodiment of a method for displaying image objects, performed by a processor of a mobile electronic device (e.g. 1305 of FIG. 1), a processor of a computer (not shown), or similar. In step S1110, an image object is acquired from memory (e.g. 1306 of FIG. 1) or storage media (1313 of FIG. 1). In step S1120 an orientation type for the acquired image object is acquired. The orientation type may be acquired from the described orientation tag or the described udat box. In step S1130, the acquired image object is displayed in response to the acquired orientation type. The display details may refer to the above description for FIGS. 10a to 10h.

Figure 12:
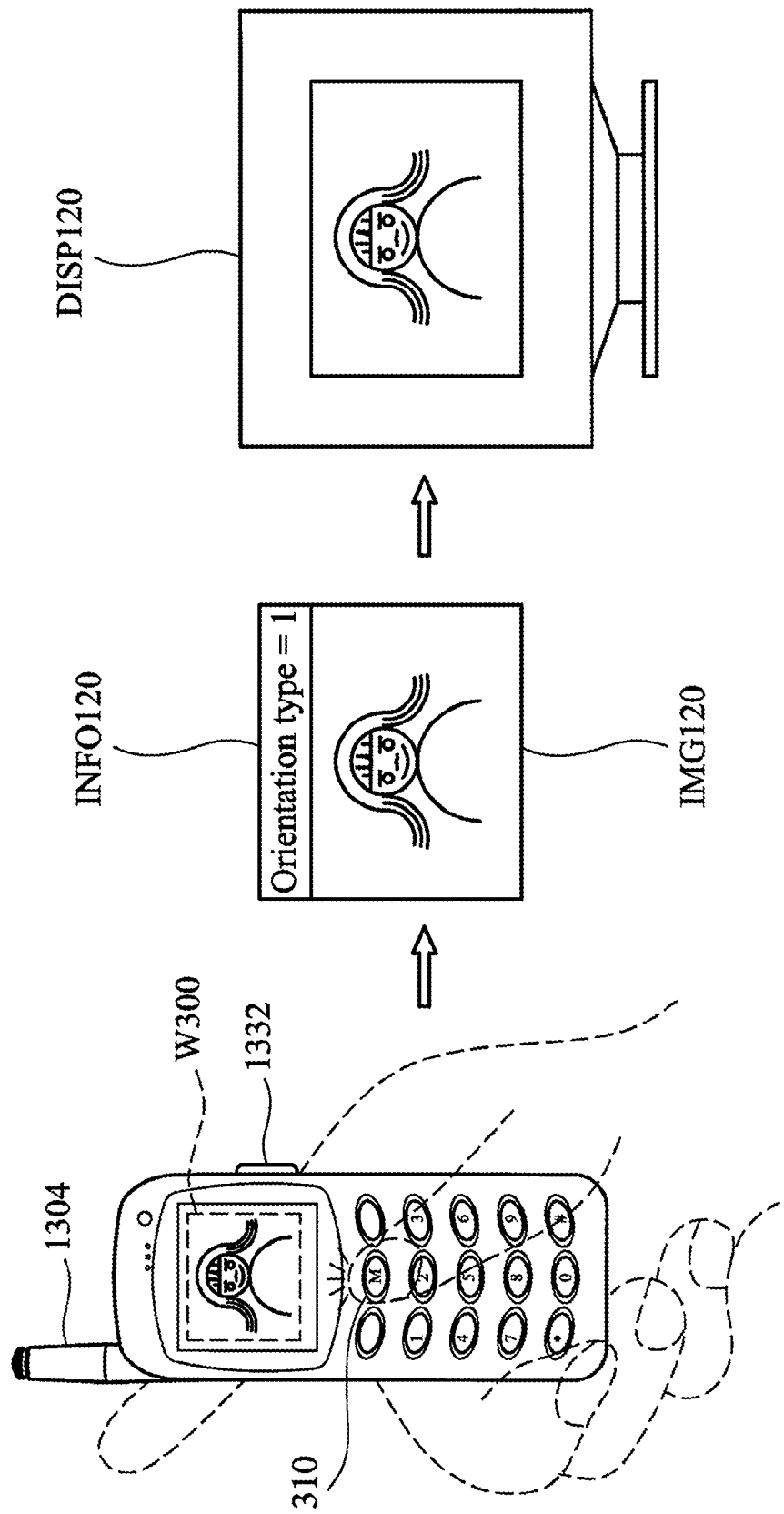
FIGS. 12 to 15 are diagrams respectively illustrating capture of an image by a mobile phone, and display of the captured image of the person by an external display.

Details of the methods for capturing and displaying images of objects are further illustrated in the following examples. FIG. 12 is a diagram illustrating capture of an image by a mobile phone, and display of the captured image of the person by an external display. As an image sensor 1309 of the mobile phone is placed as shown in FIG. 7a, the described table 91 (FIG. 9a) is provided (referring to step S811 of FIG. 8). When a shutter or recording signal is detected (referring to step S821 of FIG. 8), a processor determines that a hard shutter key 310 identified with "V-Obj" generates the shutter or recording signal (referring to step S831), acquires an image object IMG120 (referring to step S841), determines an orientation type equal to one INFO120 for the acquired image object IMG120 captured by the hard shutter key 310 by retrieving the provided table 91 (referring to step S851) and stores the acquired image object IMG120 with the determined orientation type INFO120. And then, a computer acquires the stored image object IMG120 (referring to step S1110 of FIG. 11), acquires the stored orientation type equal to one for the acquired image object (referring to step S1120 of FIG. 11) and displays the acquired image object IMG120 in response to the acquired orientation type equal to one, the display result is as shown in an image DISP120. Note that, the mobile phone may also display the acquired image object on a screen thereof in response to the stored orientation type by a photo browsing application. The display result can be deduced by the analogy of FIG. 12.

Figure 13:
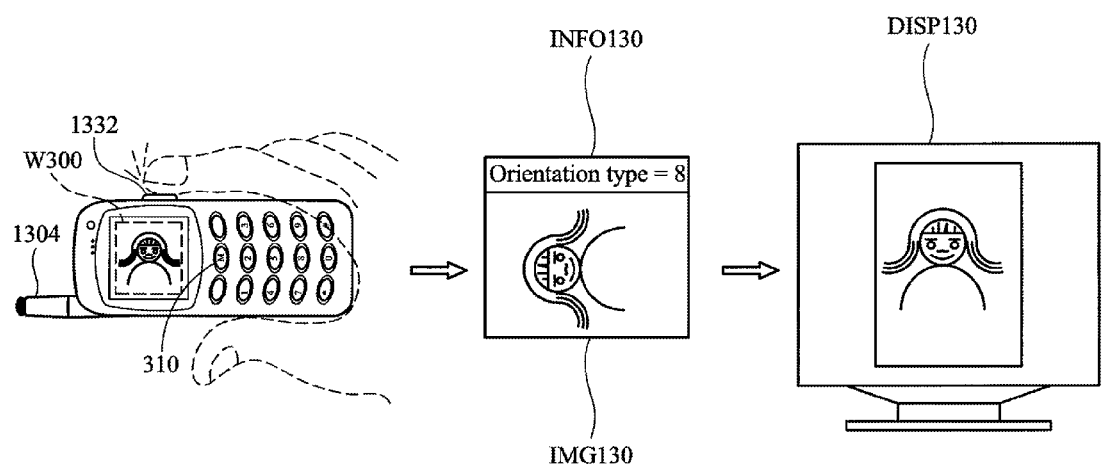

FIG. 13 is a diagram illustrating capture of an image by a mobile phone, and display of the captured image of the person by an external display. As an image sensor 1309 of the mobile phone is placed as shown in FIG. 7a, the described table 91 (FIG. 9a) is provided (referring to step S811 of FIG. 8). When a shutter or recording signal is detected (referring to step S821 of FIG. 8), a processor determines that a side shutter button 1332 identified with "H-Obj" generates the shutter or recording signal (referring to step S831), acquires an image object IMG130 (referring to step S841), determines an orientation type equal to eight INFO130 for the acquired image object IMG130 captured by the side shutter button 1332 by retrieving the provided table 91 (referring to step S851) and stores the acquired image object IMG130 with the determined orientation type INFO130. And then, a computer acquires the stored image object IMG130 (referring to step S1110 of FIG. 11), acquires the stored orientation type equal to eight for the acquired image object (referring to step S1120 of FIG. 11) and displays the acquired image object IMG130 in response to the acquired orientation type equal to eight, the display result is as shown in an image DISP130. Note that, the mobile phone may also display the acquired image object on a screen thereof in response to the stored orientation type by a photo browsing application. The display result can be deduced by the analogy of FIG. 13.

Figure 14:
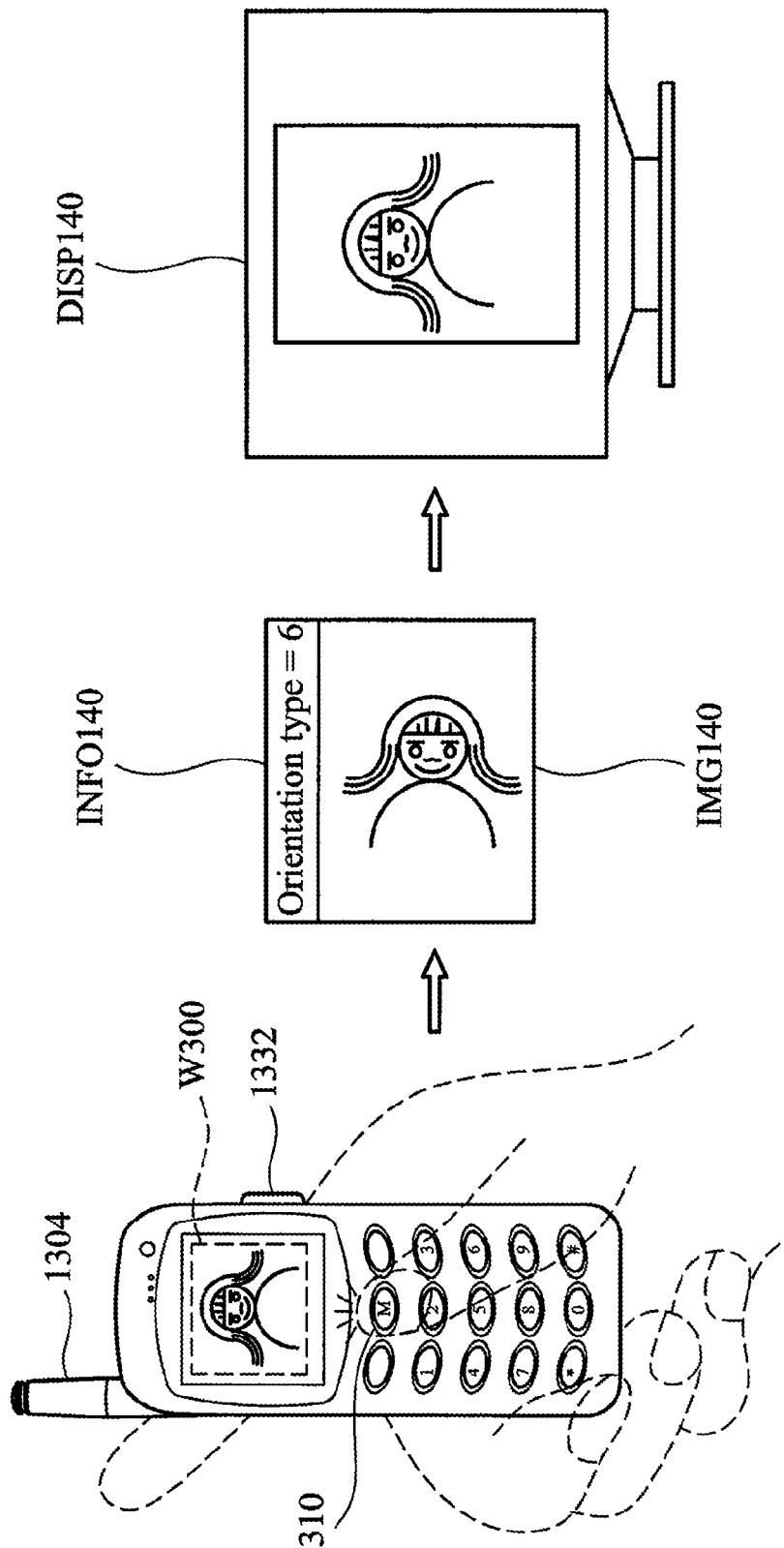

FIG. 14 is a diagram illustrating capture of an image by a mobile phone, and display of the captured image of the person by an external display. As an image sensor 1309 of the mobile phone is placed as shown in FIG. 7b, the described table 93 (FIG. 9b) is provided (referring to step S811 of FIG. 8). When a shutter or recording signal is detected (referring to step S821 of FIG. 8), a processor determines that a hard shutter key 310 identified with "V-Obj" generates the shutter or recording signal (referring to step S831), acquires an image object IMG140 (referring to step S841), determines an orientation type equal to six INFO140 for the acquired image object IMG140 captured by the hard shutter key 310 by retrieving the provided table 93 (referring to step S851) and stores the acquired image object IMG140 with the determined orientation type INFO140. And then, a computer acquires the stored image object IMG140 (referring to step S1110 of FIG. 11), acquires the stored orientation type equal to six for the acquired image object (referring to step S1120 of FIG. 11) and displays the acquired image object IMG140 in response to the acquired orientation type equal to six, the display result is as shown in an image DISP140. Note that, the mobile phone may also display the acquired image object on a screen thereof in response to the stored orientation type by a photo browsing application. The display result can be deduced by the analogy of FIG. 14.

Figure 15:
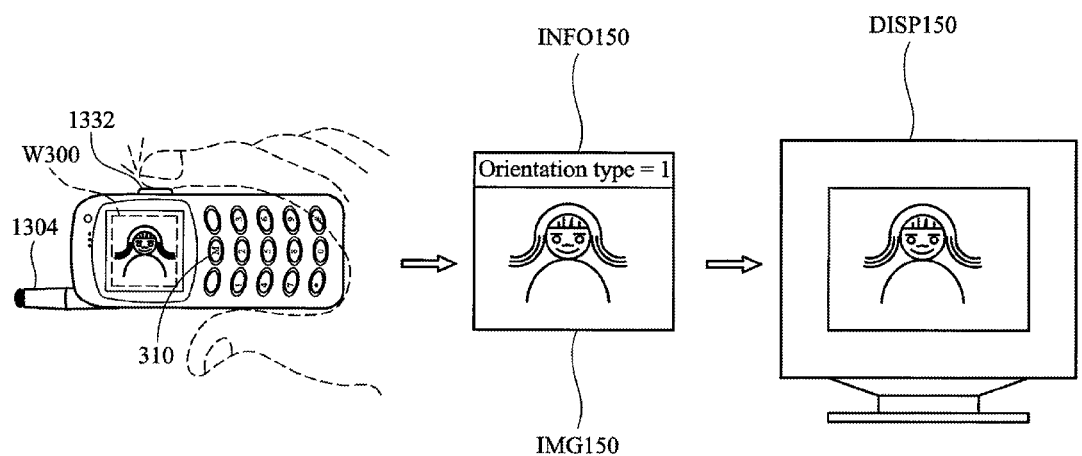

FIG. 15 is a diagram illustrating of an image by a mobile phone, and display of the captured image of the person by an external display. As an image sensor 1309 of the mobile phone is placed as shown in FIG. 7b, the described table 93 (FIG. 9a) is provided (referring to step S811 of FIG. 8). When a shutter or recording signal is detected (referring to step S821 of FIG. 8), a processor determines that a side shutter button 1332 identified with "H-Obj" generates the shutter or recording signal (referring to step S831), acquires an image object IMG150 (referring to step S841), determines an orientation type equal to one INFO150 for the acquired image object IMG150 captured by the side shutter button 1332 by retrieving the provided table 93 (referring to step S851) and stores the acquired image object IMG1530 with the determined orientation type INFO150. And then, a computer acquires the stored image object IMG150 (referring to step S1110 of FIG. 11), acquires the stored orientation type equal to one for the acquired image object (referring to step S1120 of FIG. 11) and displays the acquired image object IMG150 in response to the acquired orientation type equal to one, the display result is as shown in an image DISP150. Note that, a mobile phone may also display the acquired image object on a screen thereof in response to the stored orientation type by a photo browsing application. The display result can be deduced by the analogy of FIG. 15.

Figure 16A:
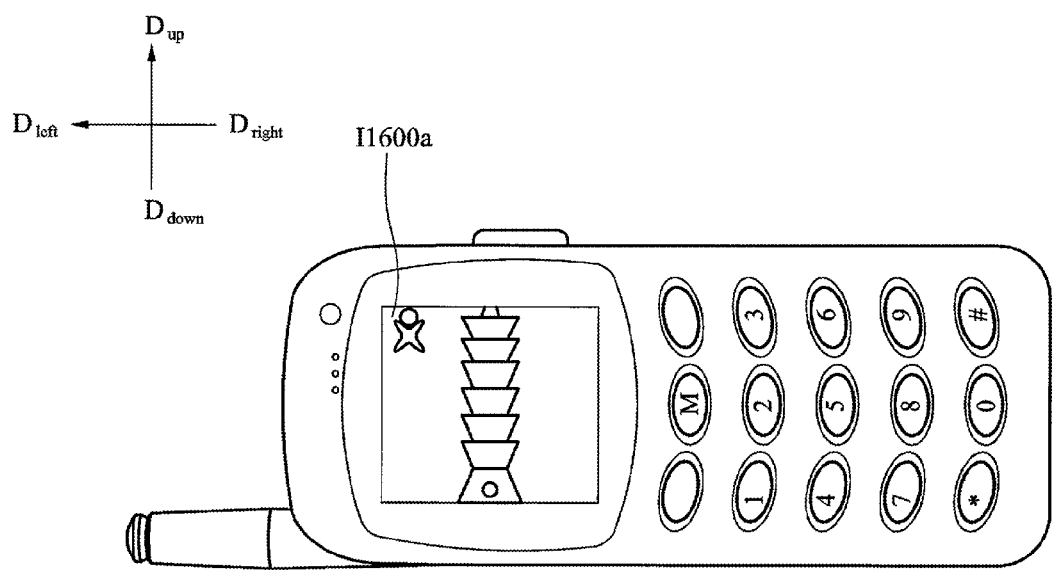
FIGS. 16a to 16d are diagrams illustrating adjustment of a direction indicated by an iconic indicator in various aspects before capturing a skyscraper.
Figure 16B:
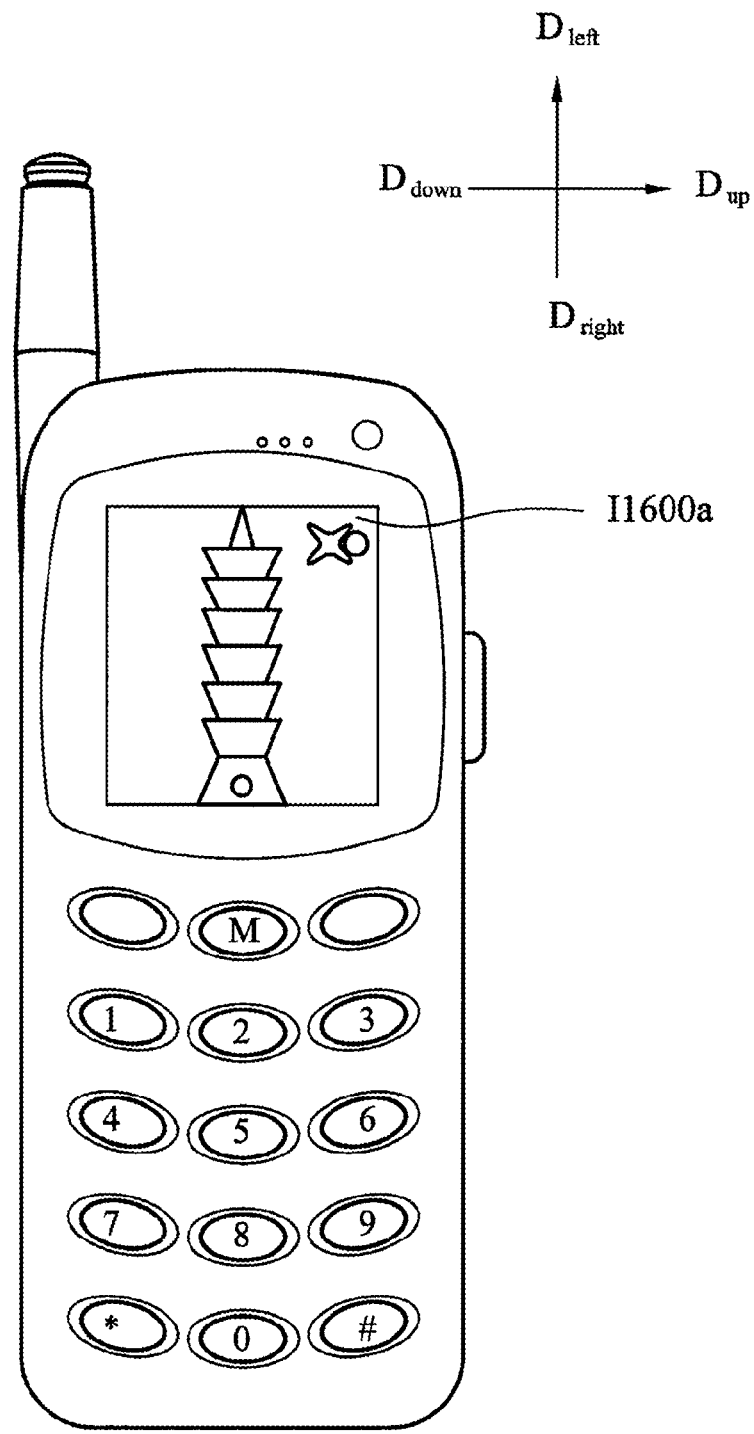
Figure 16C:
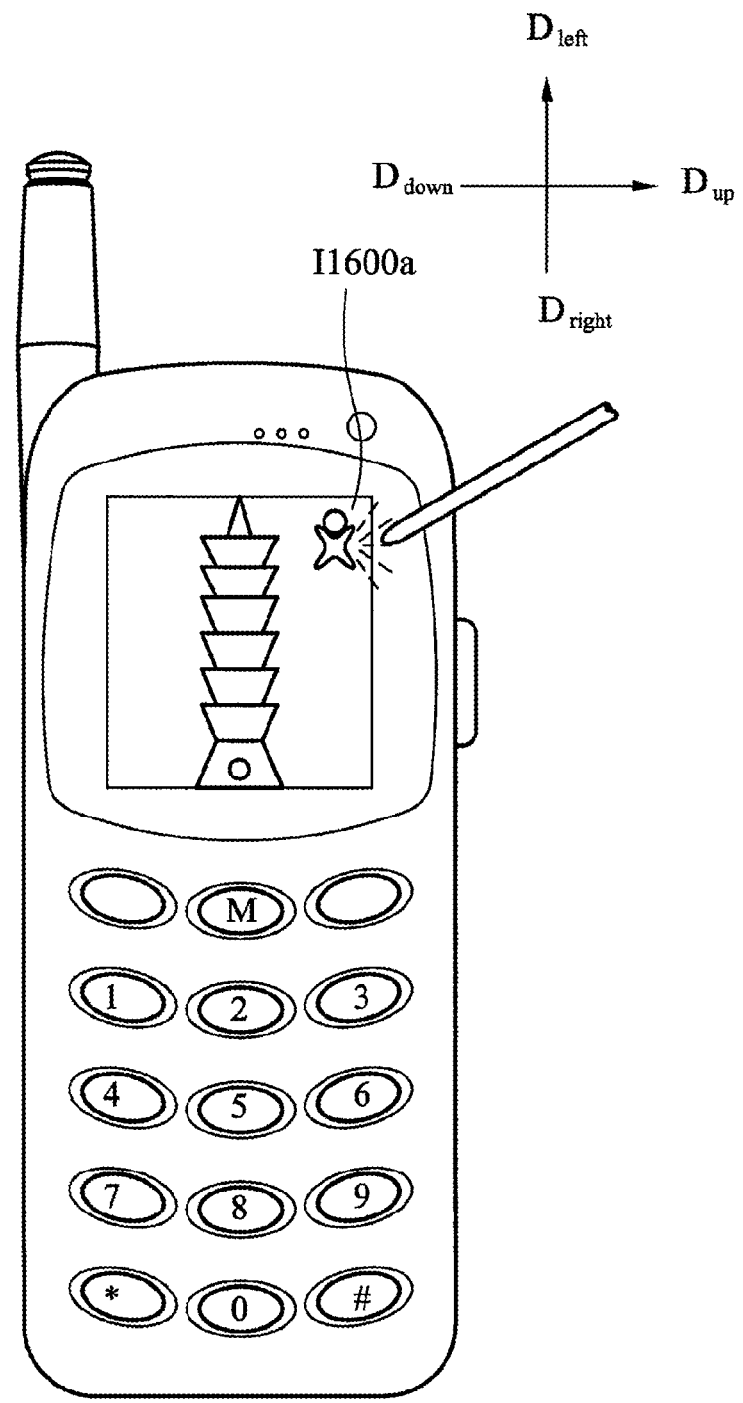
Figure 16D:
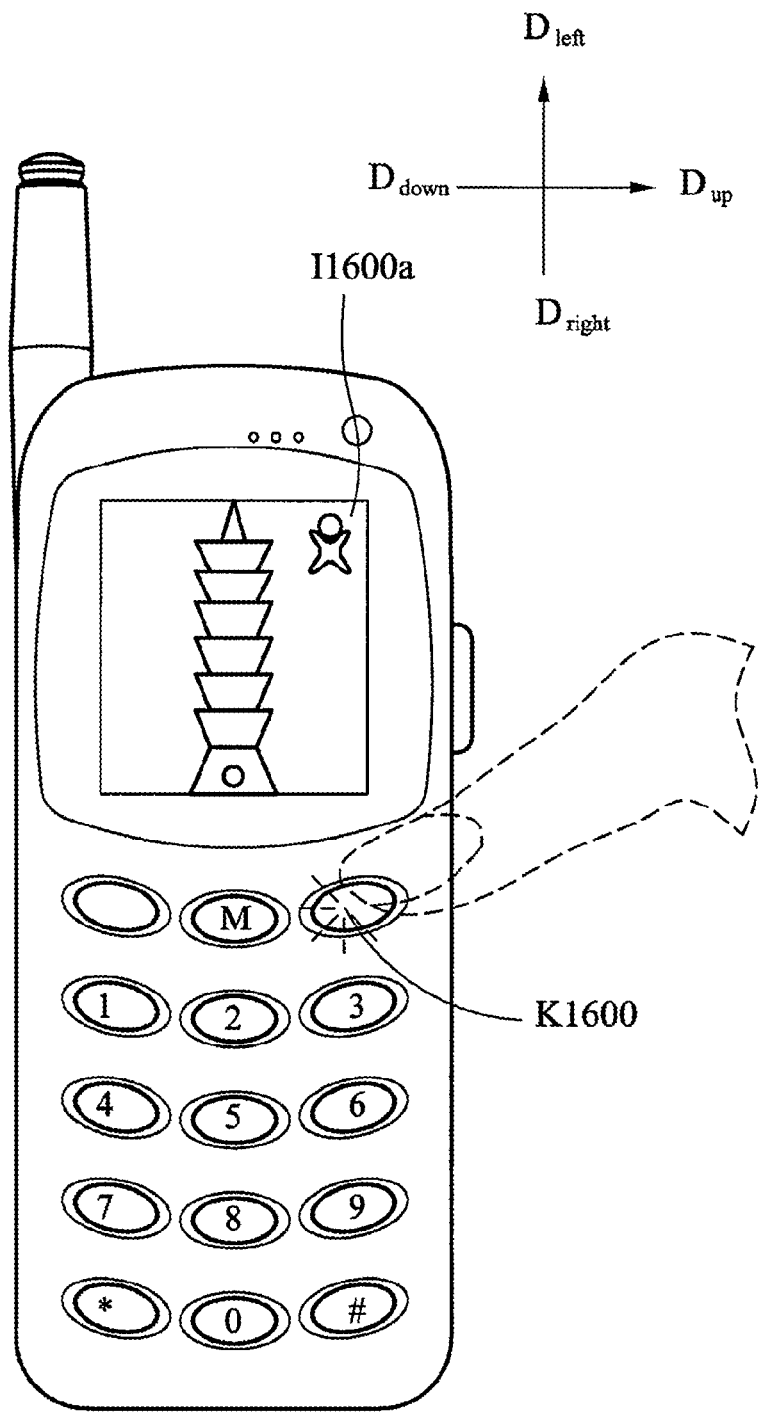

In some embodiments, the orientation type may be determined by a direction of an iconic indicator displayed on a touch panel (e.g. 1323 of FIG. 1) or a display device 1314 (e.g. 1314 of FIG. 1). When the iconic indicator is displayed on a specific region of the touch panel, such as the upper-left corner, upper-right corner, or similar, the direction of the iconic indicator may be adjusted by clicking the specific region. For example, supposing that at least one short edge of an image sensor of a mobile electronic device is placed parallel to at least one short edge of the mobile electronic device as shown in FIG. 7b. FIGS. 16a to 16d are diagrams illustrating adjustment of a direction indicated by an iconic indicator in various aspects before capturing a skyscraper. Referring to FIG. 16a, a head of an iconic person I1600a is initially displayed toward a direction $D_{up}$ because the image sensor is placed as shown in FIG. 7b. When capturing a skyscraper, however, a user recognizes that the skyscraper cannot be fully viewed in the touch panel as shown in FIG. 16a. The user then vertically holds the mobile electronic device to focus on the skyscraper as shown in FIG. 16b and discovers that the head of the iconic person I1600a towards a wrong direction. After that, the user can click a specific region on the touch panel, displaying the iconic person, to counterclockwise rotate the iconic person by ninety degrees, i.e. from the direction $D_{up}$ to a direction $D_{left}$. When detecting a signal indicating that the specific region on the touch panel is clicked via a touch panel controller (e.g. 1320 of FIG. 1), a processor (e.g. 1305 of FIG. 1) counterclockwise rotates the iconic person on the touch panel by ninety degrees, as shown in I1600b of FIG. 16c. It is also available that the touch panel controller clockwise rotates the iconic person on the touch panel by ninety degrees when detecting a signal indicating that the specific region on the touch panel is clicked. Furthermore, the iconic person may be rotated by pressing a hard key on a keypad (1331 of FIG. 1) as shown in FIG. 16d. When detecting a signal indicating that a hard key K1600 on a keypad is pressed via a keypad controller (e.g. 1330 of FIG. 1), the processor counterclockwise rotates the iconic person on the touch panel by ninety degrees, as shown in I1600b of FIG. 16d. Upon the iconic person is rotated, a direction flag stored in a memory (e.g. 1306 of FIG. 1) is updated to indicate that the head of the iconic person towards a particular direction.

Figure 17:
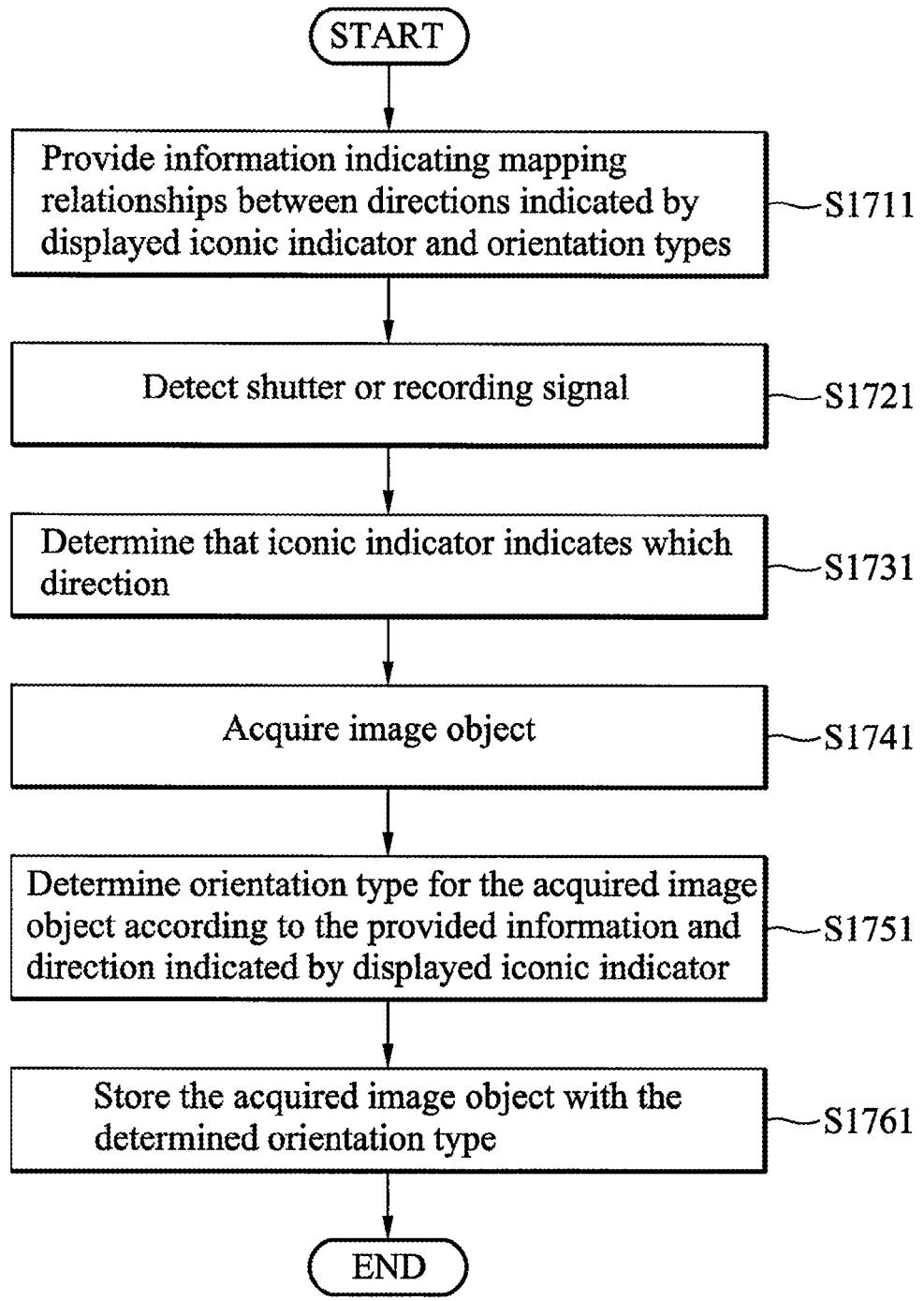
FIG. 17 is a flowchart illustrating an embodiment of a method for capturing images of objects.
Figure 18:
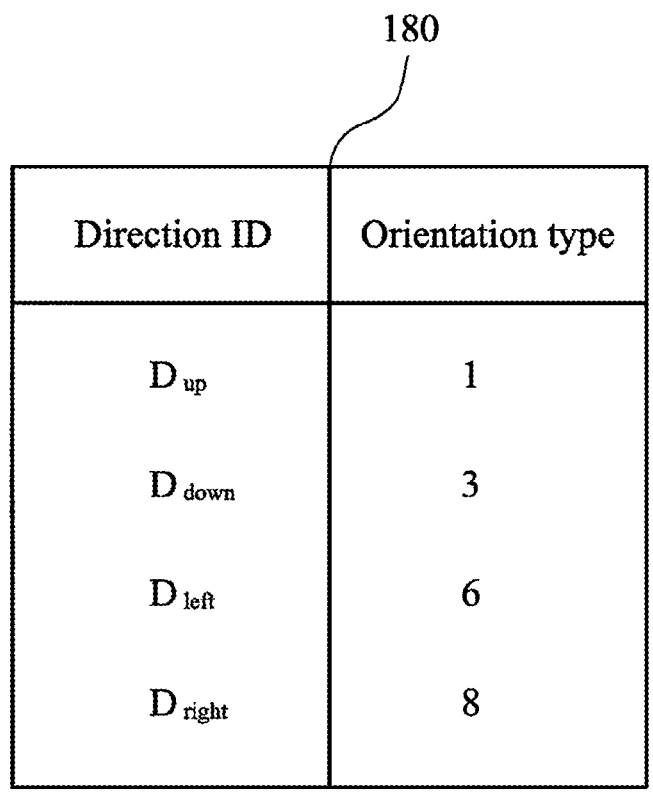
FIG. 18 is a diagram containing a table.

FIG. 17 is a flowchart illustrating an embodiment of a method for capturing images of objects, performed by a processor of a mobile electronic device (e.g. 1305 of FIG. 1). In step S1711, information indicating mapping relationships between directions indicated by a displayed iconic indicator and orientation types is provided. Such information may be stored in memory (e.g. 1306 of FIG. 1) or storage media (e.g. 131 of FIG. 1). FIG. 18 is a diagram containing a table 180. The table 180 describes information indicating mapping relationships when an image sensor is placed as shown in FIG. 7b. Wherein, "$D_{up}$", "$D_{down}$", "$D_{left}$" and "$D_{right}$" may identify the directions as shown in FIGS. 16a to 16c. Eight orientation types ranging from 1 to 8 can be assigned to one of "$D_{up}$", "$D_{down}$", "$D_{left}$" and "$D_{right}$". Details of the orientation types may follow descriptions for FIGS. 10a to 10h. It is to be understood that the pixel data (i.e. discrete color values) of the acquired still images and video frames are typically stored corresponding to the described scanning process. It is to be understood that the tables 180 can be implemented in various data structures such as two-dimensional arrays or similar.

In step S1721, a shutter or recording signal is detected. The shutter or recording signal may be generated by one of soft keys on a touch panel (e.g. 1321 of FIG. 4a, 4b, 6a or 6b, or 1322 of FIG. 4a, 4b, 5a or 5b), hard keys on a keypad (e.g. 310 of FIG. 3a, 3b, 5a or 5b), and a shutter button disposed on a lateral side (e.g. 1332 of FIG. 3a, 3b, 6a or 6b). In step S1731, it is determined the displayed iconic indicator indicates which direction. The direction indicated by the displayed iconic indicator is preferably determined by inspecting the stored direction flag. The shutter signal will direct relevant electronic devices of the mobile electronic device to generate a still image. The recording signal will direct relevant electronic devices of the mobile electronic device to generate a series of video frames. In step S831, it is determined the detected shutter signal is generated by which shutter object. In step S1741, an image object is acquired via an image sensor module (e.g. 1307 of FIG. 1), a sensor controller and image processor (e.g. 1310 of FIG. 1) and/or an image encoder (e.g. 1312 of FIG. 1). In step S1751, an orientation type for the acquired image object is determined according to the provided information and the direction indicated by the displayed iconic indicator. For example, as an image sensor is placed as shown in FIG. 7b, according to the table 180 of FIG. 18, the orientation type is determined to be six when the direction indicated by the iconic indicator is "$D_{left}$" as shown in FIG. 16c or 16d. In step S1761, the acquired image object with the determined orientation type is stored in memory (e.g. 1306 of FIG. 1) or storage media (e.g. 1313 of FIG. 1). The determined orientation type may be stored in the described orientation tag (0x112) of a still image header file. The determined orientation type following a proprietary identifier (e.g. "MTKORIT") may be stored in the described user data (udat) box of an MPEG file.

Figure 19:
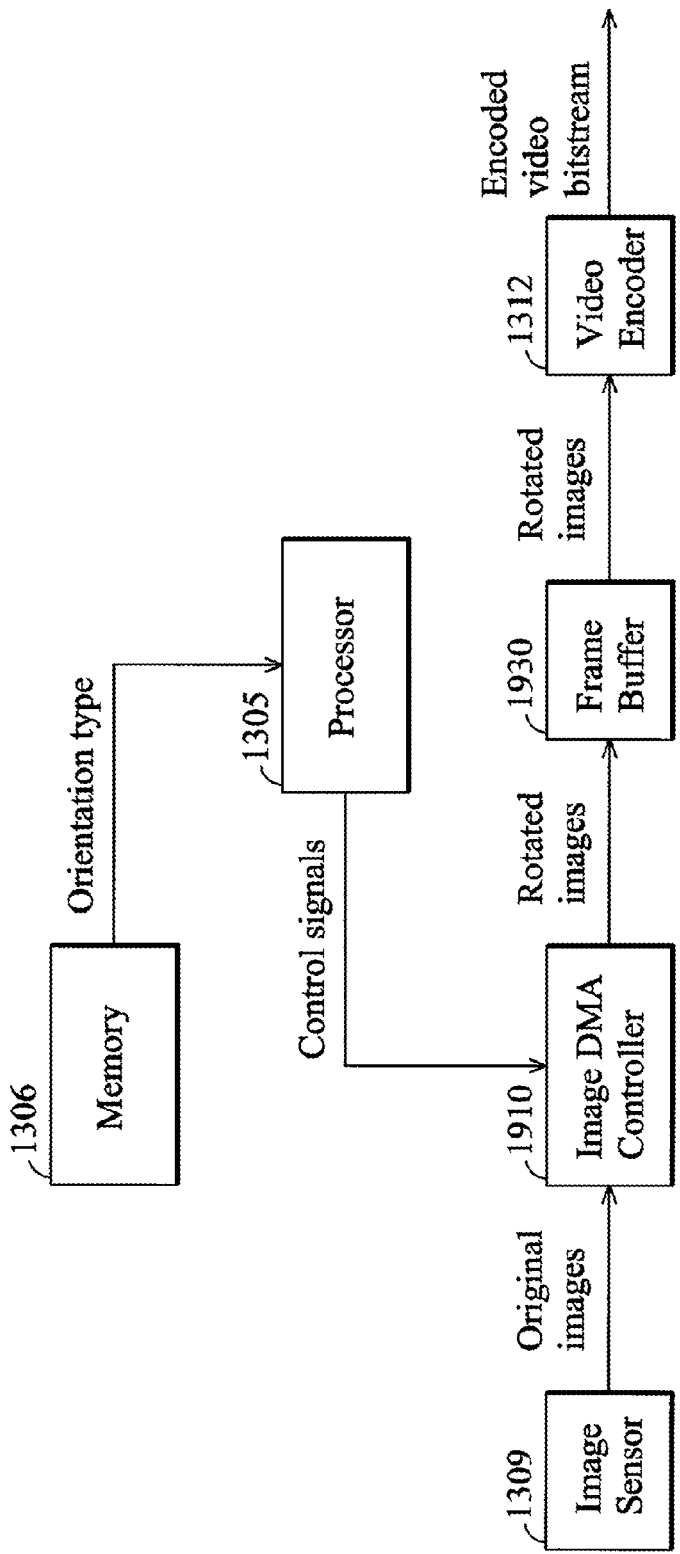
FIG. 19 is a diagram of an embodiment of a pipeline for video encoding.

FIG. 19 is a diagram of an embodiment of a pipeline for video encoding. The pipeline for video encoding comprising the processor 1305, memory 1306, image sensor 1309, video encoder 1312, an image DMA (direct memory access) controller 1910 preferably resident on the sensor controller and image processor 1310, and a frame buffer 1930 preferably resident on the memory 1306. The image DMA controller 1910 contains several buffer write procedures in hardware circuits. Before video encoding, the processor 1305 instructs the image DMA controller 1910 to employ one buffer write procedure according to a determined orientation type. Thereafter, the image DMA controller 1910 receives color values (e.g. RGB, YCbCr or similar values) of pixels along the described scanning process from the image sensor 1309 and writes the received color values of each pixel to the frame buffer 1930 with reference to the instructed buffer write procedure during video encoding. When employing the buffer write procedure, the sensed image may be rotated and stored in the frame buffer 1930. The video encoder 1312 subsequently acquires an image by serially reading color values from the frame buffer 1312, and encodes the acquired image into a video bitstream by performing MPEG, H.26x encoding methods, or similar.

Figure 20:
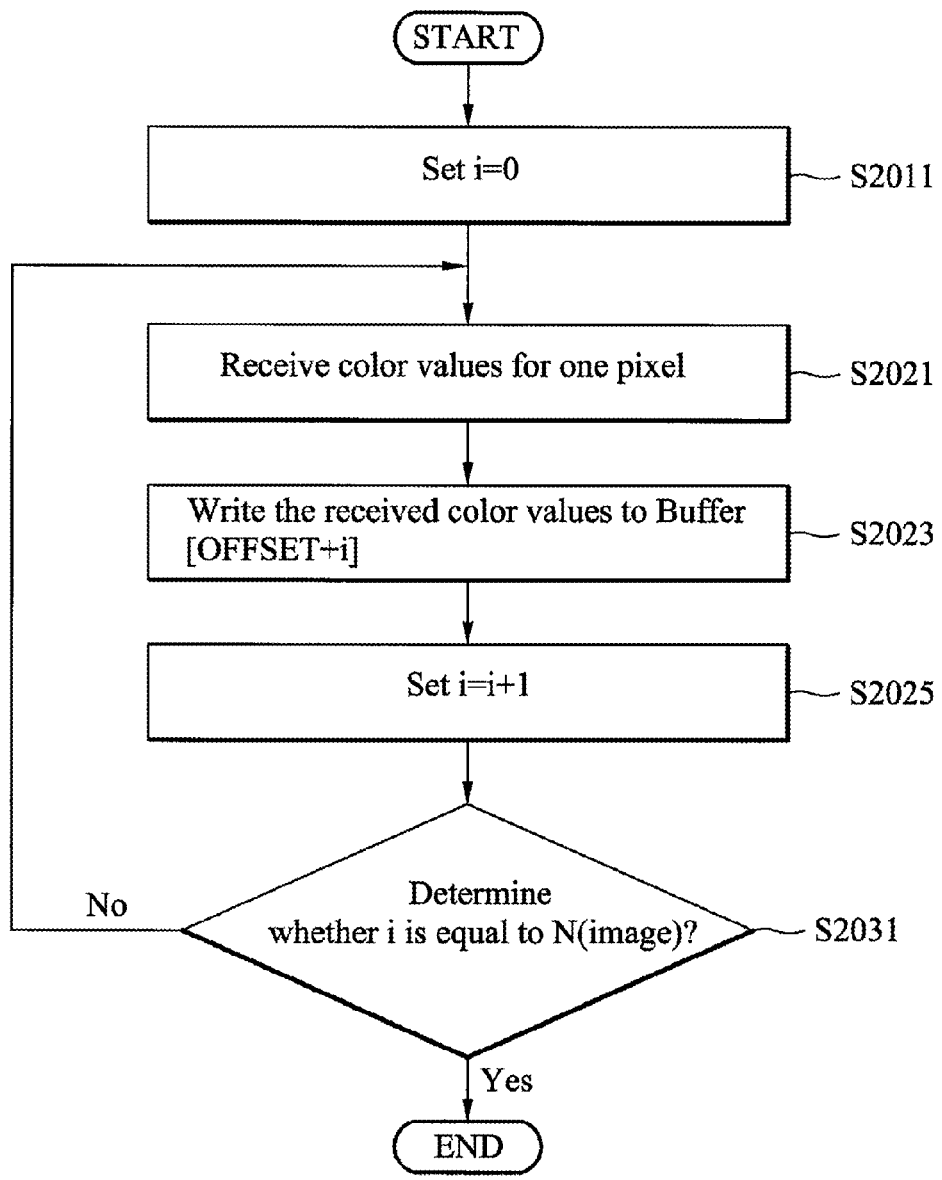
FIG. 20 is a flowchart illustrating an embodiment of buffer write procedure for writing one sensed image to a frame buffer.
Figure 21:
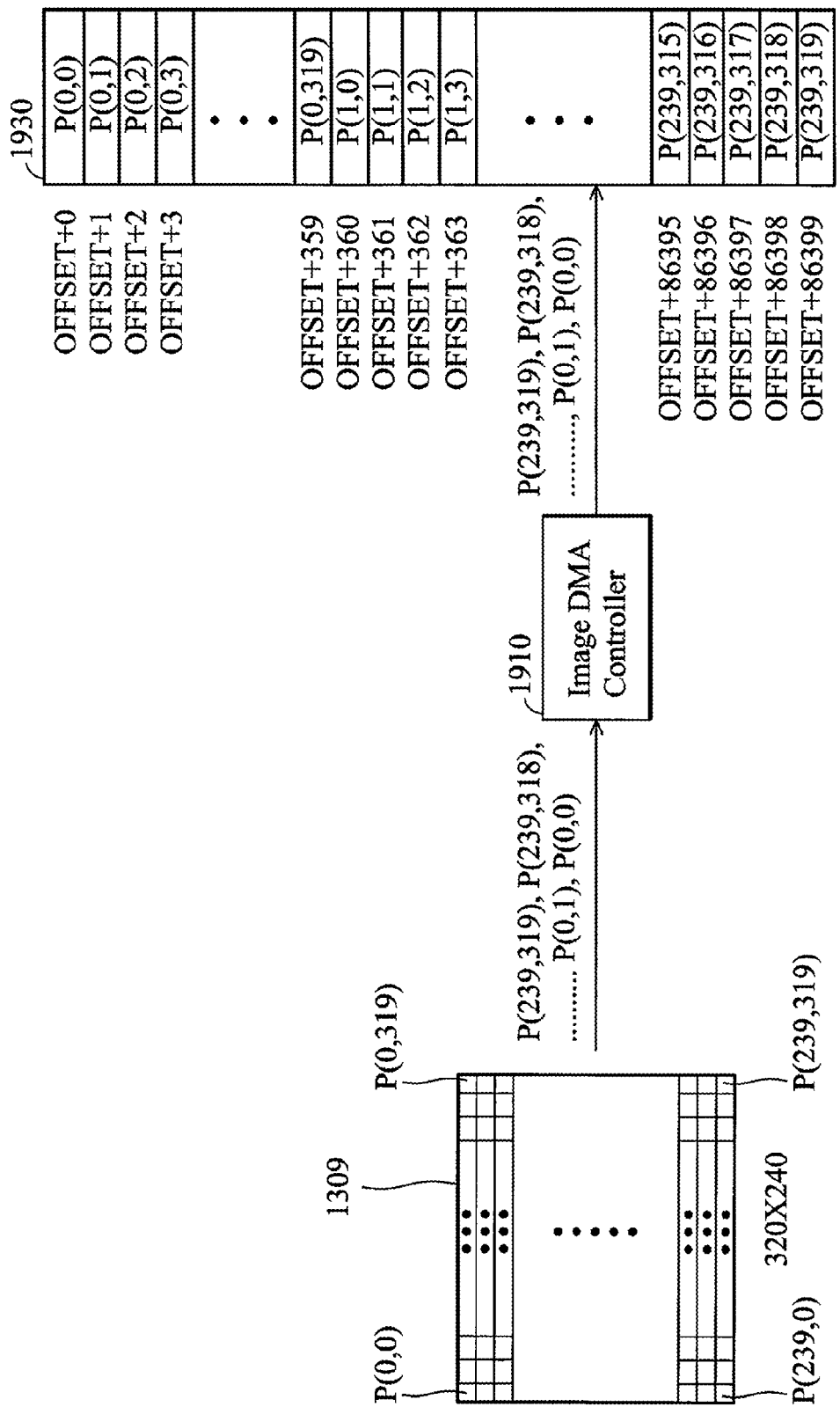
FIG. 21 is a diagram of an image DMA controller writing pixel values of one sensed image from an image sensor to a frame buffer by employing a buffer write procedure of FIG. 20.

FIG. 20 is a flowchart illustrating an embodiment of buffer write procedure for writing one sensed image to a frame buffer when at least one short edge of an image sensor of a mobile electronic device is placed parallel to at least one short edge of a mobile electronic device as shown in FIG. 7b, and the rotation type is one. In step S2011, a variable i is set to zero. In step S2021, color values for one pixel are received. In step S2023, the received color values are written to Buffer [OFFSET+i], where the constant "OFFSET" indicates the beginning address of the frame buffer 1930. In step S2025, the variable i is increased by one. Note that each cell in the frame buffer 1930 has sufficient space for storing color values of one pixel. In step S2031, it is determined whether i is equal to a total number of pixels denoted as N(image). If so, the process ends, otherwise, the process proceeds to step S2021 in order to process the next pixel. Note that the sequence of steps S2011 to S2031 is only provided for improved understanding. Those skilled in the art may arrange functions of S2011 to S2031 in parallel hardware circuits without departing from the scope and spirit of the buffer write procedure in order to improve decoding efficiency. FIG. 21 is a diagram of an image DMA controller writing pixel values of one sensed image from an image sensor to a frame buffer by employing the buffer write procedure as shown in FIG. 20. Note that, when employing the buffer write procedure as shown in FIG. 20, the sensed image is not rotated.

Figure 22:
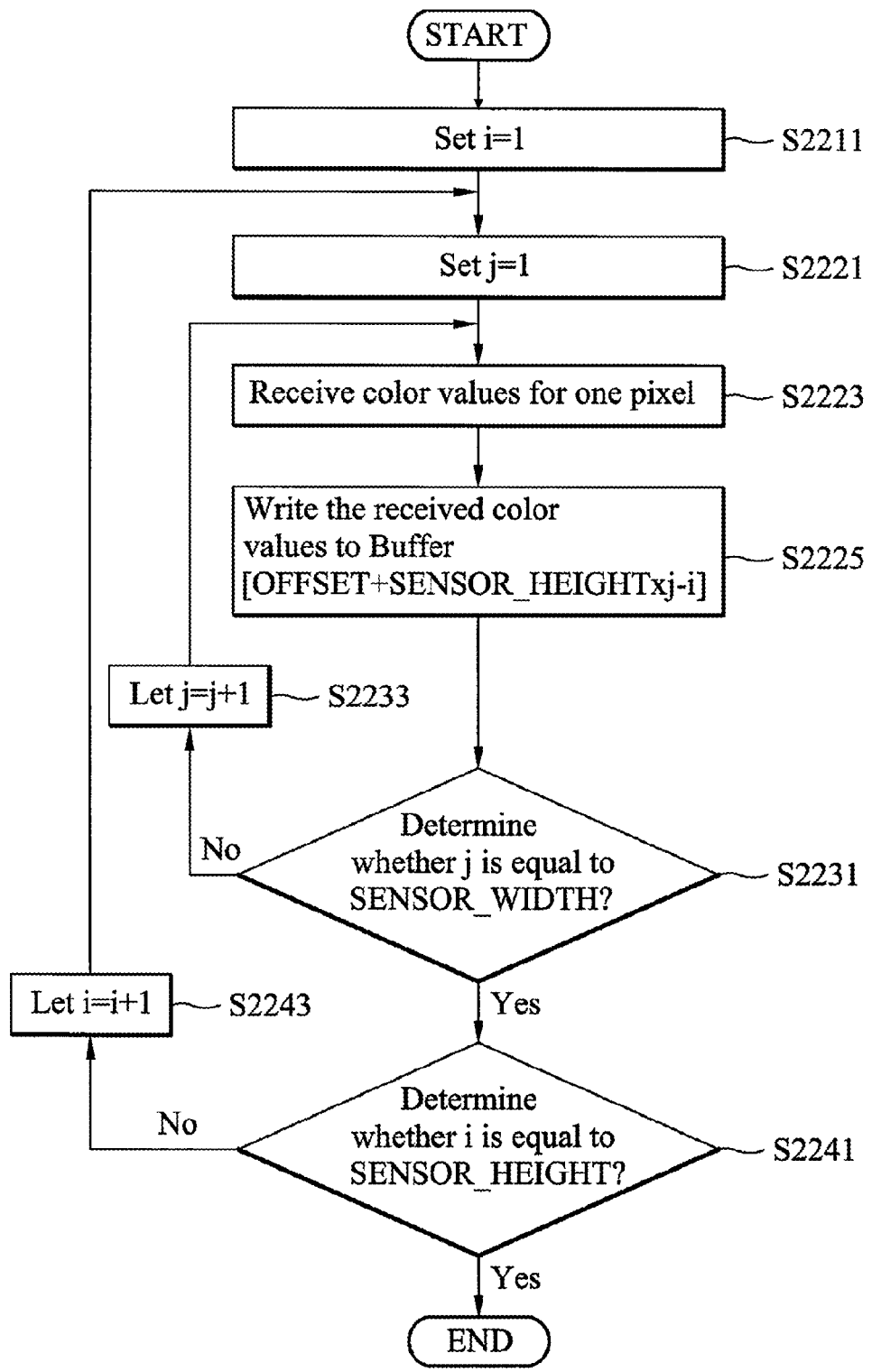
FIG. 22 is a flowchart illustrating an embodiment of buffer write procedure for writing one sensed image to a frame buffer.
Figure 23:
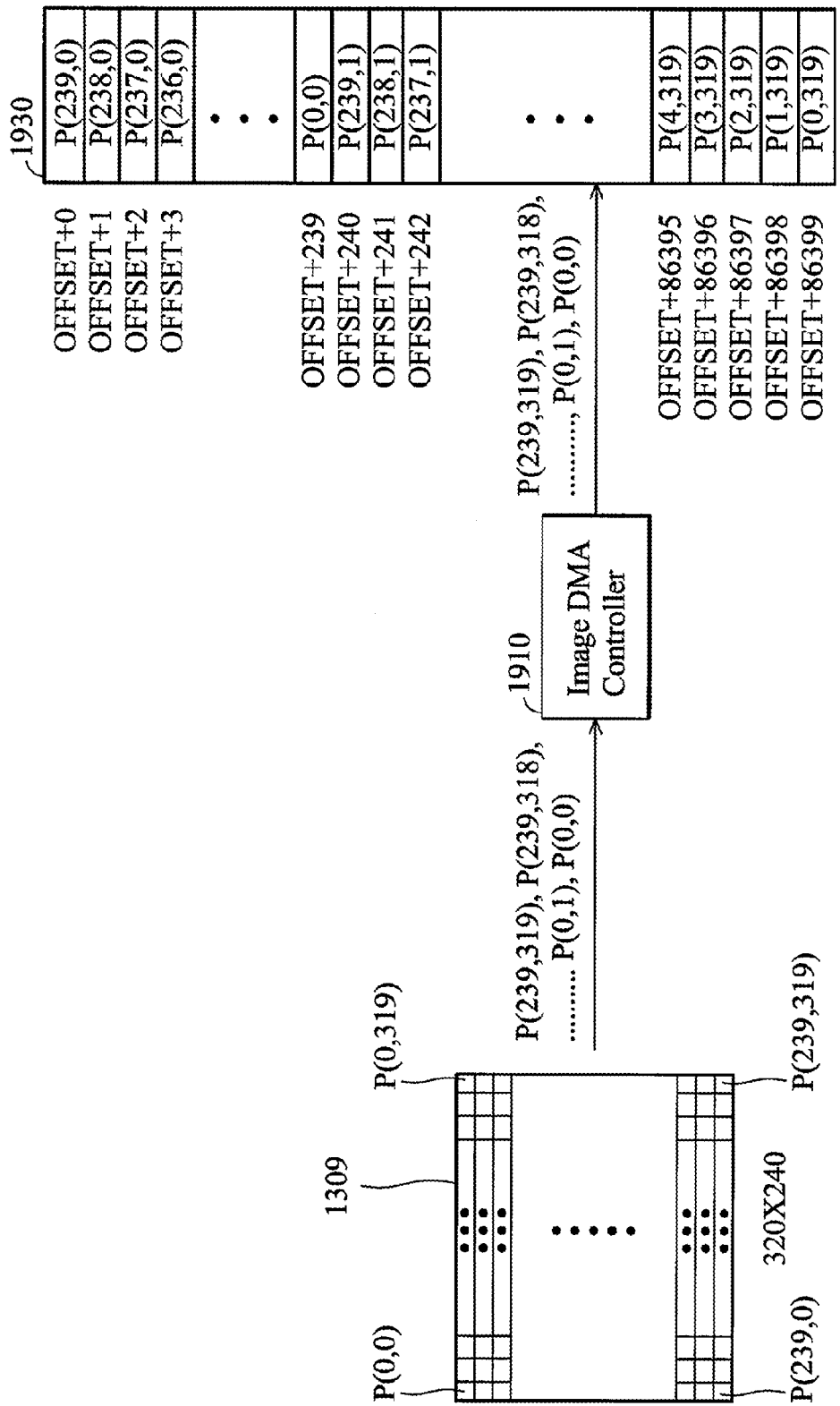
FIG. 23 is a diagram of an image DMA controller writing pixel values of one sensed image from an image sensor to a frame buffer by employing a buffer write procedure of FIG. 22.

FIG. 22 is a flowchart illustrating an embodiment of buffer write procedure for writing one sensed image to a frame buffer when at least one short edge of an image sensor of a mobile electronic device is placed parallel to at least one short edge of a mobile electronic device as shown in FIG. 7b, and the rotation type is six. In step S2211, a variable i is set to one. In step S2221, a variable j is set to one. In step S2223, color values for one pixel are received. In step S2225, the received color values are written to Buffer[OFFSET+SENSOR_HEIGHTxj−i], where the constant "OFFSET" indicates the beginning address of the frame buffer 1930, and the constant "SENSOR_HEIGHT" indicates the height of the image sensor 1309. In step S2231, it is determined whether j is equal to a constant "SENOR_WIDTH" indicating the width of the image sensor 1309. If so, the process proceeds to step S2241, otherwise, to step S2233. In step S2233, the variable j is increased by one. In step S2241, it is determined whether i is equal to the constant "SENSOR_HEIGHT". If so, the process ends, otherwise, the process proceeds to step S2243 in order to process the next pixel. In step S2243, the variable j is increased by one. Note that the sequence of steps S2211 to S2243 is only provided for improved understanding. Those skilled in the art may arrange functions of S2211 to S2243 in parallel hardware circuits without departing from the scope and spirit of the buffer write procedure in order to improve decoding efficiency. FIG. 23 is a diagram of an image DMA controller writing pixel values of one sensed image from an image sensor to a frame buffer by employing the buffer write procedure as shown in FIG. 23. Note that, when employing the buffer write procedure as shown in FIG. 23, the sensed image is rotated.

Figure 24:
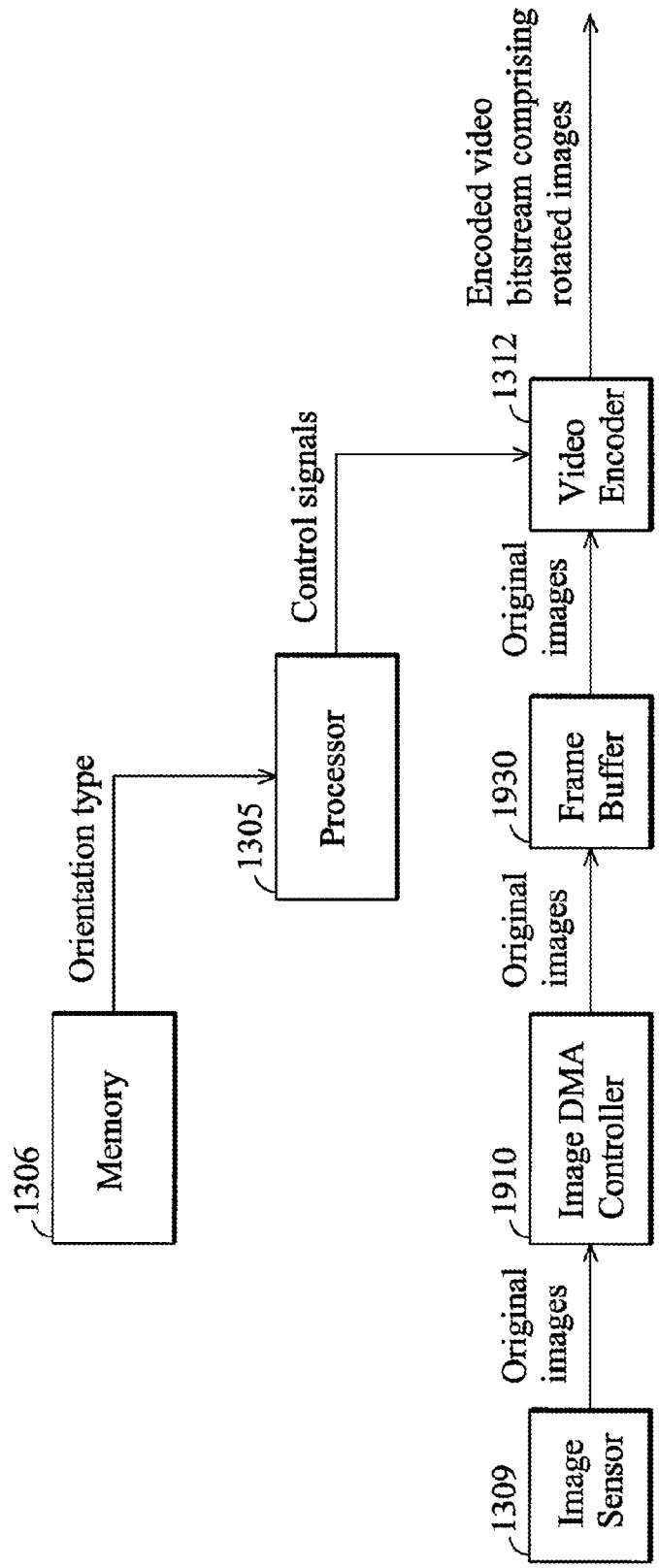
FIG. 24 is a diagram of an embodiment of a pipeline for video encoding.

FIG. 24 is a diagram of an embodiment of a pipeline for video encoding. The pipeline for video encoding comprising the processor 1305, memory 1306, image sensor 1309, video encoder 1312, an image DMA (direct memory access) controller 1910 preferably resident on the sensor controller and image processor 1310, and a frame buffer 1930 preferably resident on the memory 1306. The video encoder 1312 contains several buffer read procedures in hardware circuits. Before video encoding, the processor 1305 instructs the video encoder 1312 to employ one buffer read procedure according to a determined orientation type. Thereafter, the image DMA controller 1910 receives color values (e.g. RGB, YCbCr or similar values) of pixels along the described scanning process from the image sensor 1309 and writes the received color values of each pixel to the frame buffer 1930 from the beginning to the end. The video encoder 1312 subsequently acquires an image by reading color values from the frame buffer 1930 with reference to the instructed buffer read procedure, and encodes the acquired image into a video bitstream by performing MPEG, H.26x encoding methods, or similar. When employing the buffer read procedure, the sensed image may be rotated and encoded in a video bitstream.

Figure 25A:
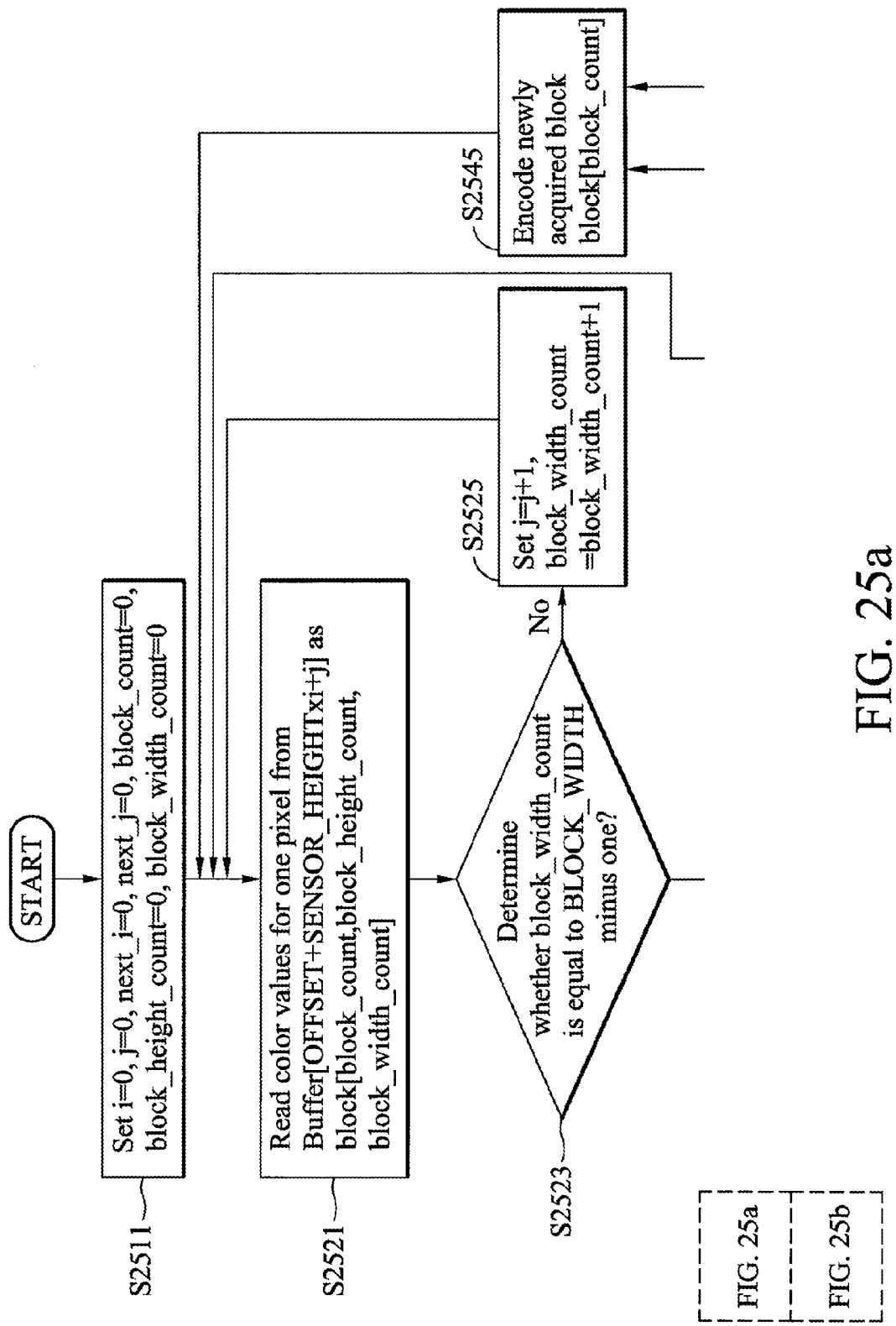
FIGS. 25a and 25b are flowcharts illustrating an embodiment of buffer read procedure for reading one sensed image from a frame buffer.
Figure 25B:
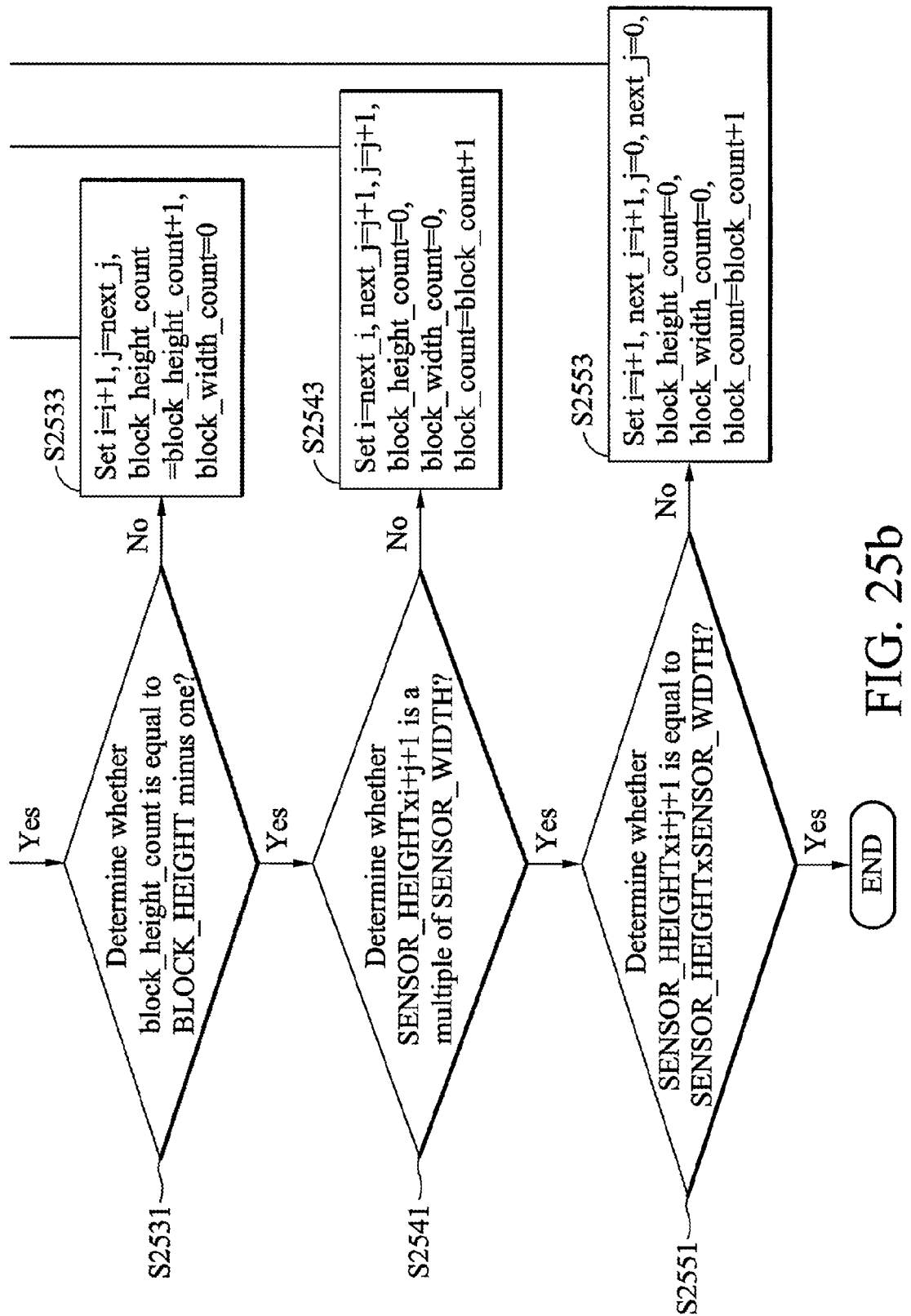

FIG. 25 is a flowchart illustrating an embodiment of buffer read procedure for reading one sensed image from a frame buffer when at least one short edge of an image sensor of a mobile electronic device is placed parallel to at least one short edge of a mobile electronic device as shown in FIG. 7b, and the rotation type is one. The buffer read procedure organizes the image in the frame buffer into blocks, and performs a series of encoding methods for each block, such as color space transform, down-sampling, discrete cosine transform (DCT), quantization, variable length encoding (VLE), entropy encoding, motion estimation, and/or others. In step S2511, variables i, j, next_i, next_j, block_count, block_height_count, and block_width_count are initially set to zeros. In step S2521, color values for one pixel are read from Buffer[OFFSET+SENSOR_HEIGHTxi+j] and treated as one pixel of a block, denoted as block[block_count,block_height_count,block_width_count], where the constant "OFFSET" indicates the beginning address of the frame buffer 1930, and the constant "SENSOR_HEIGHT" indicates the height of the image sensor 1309. In step S2523, it is determined whether the variable block_width_count is equal to a constant "BLOCK_WIDTH" minus one, where the constant "BLOCK_WIDTH" indicates a block width. If so, the process completes one row of a block and proceeds to step S2531, otherwise, to step S2525. In step S2525, the variables j, and block_width_count are increased by one. In step S2531, it is determined whether the variable block_height_count is equal to a constant "BLOCK_HEIGHT" minus one, where the constant "BLOCK_HEIGHT" indicates a block height. If so, the process completes all rows of a block and proceeds to step S2541, otherwise, to step S2533. In step S2533, the variable i is increased by one, the variable j is set to the variable next_j, the variable block_height_count is increased by one, and the variable block_width_count is set to zero. In step S2541, it is determined whether value of SENSOR_HEIGHTxi+j+1 is a multiple of the constant "SENSOR_WIDTH". Supposing that the width of an image sensor is 320, the multiples of the constant "SENSOR_WIDTH" are 320, 640, 960, 1280, and so on. If so, the process completes all rows of a slice and proceeds to step S2551, otherwise, to step S2543. In step S2543, the variable i is set to the variable next_i, the variable next_j is set to the variable j plus one, the variable j is increased by one, the variables block_height_count and block_width_count are set to zero, and the variable block_count is increased by one. In step S2551, it is determined whether value of SENSOR_HEIGHTxi+j+1 is equal to a value of SENSOR_HEIGHTxSENSOR_WIDTH. If so, the process ends to complete a sensed image, otherwise, to step S2553. In step S2553, the variable i is increased by one, the variable next_i is set to the variable i plus one, the variables j, next_j, block_width_count and block_height_count are set to zeros, and the variable block_count is increased by one. In step S2545, the newly acquired block denoted as block[block_count] is encoded. The newly acquired block may be encoded by color space transform, down-sampling, discrete cosine transform (DCT), quantization, variable length encoding (VLE), entropy encoding, motion estimation, and/or others. Note that the sequence of steps S2511 to S2553 is only provided for improved understanding. Those skilled in the art may arrange functions of S2511 to S2553 in parallel hardware circuits without departing from the scope and spirit of the buffer read procedure in order to improve decoding efficiency.

Figure 26A:
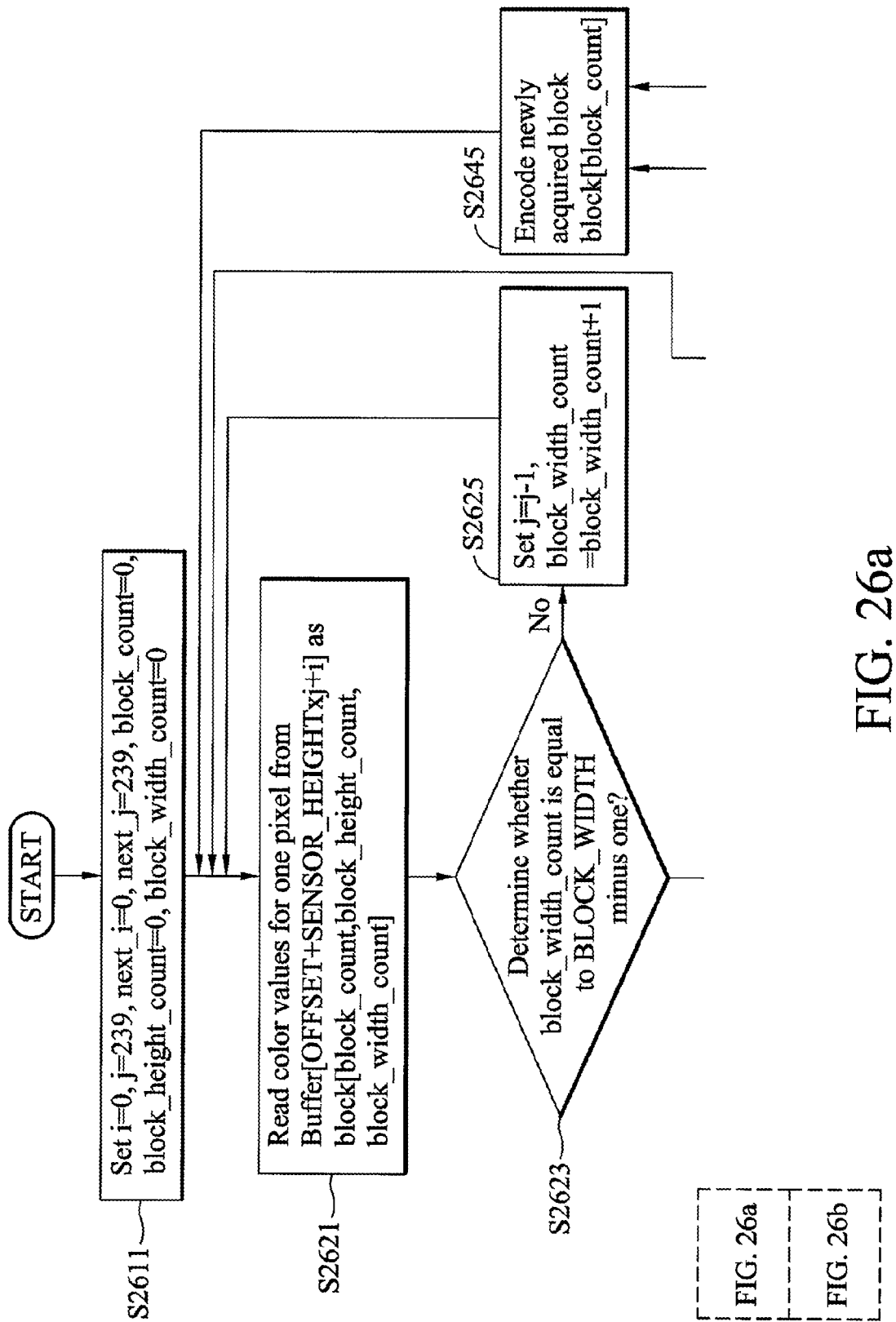
FIGS. 26a and 26b are flowcharts illustrating an embodiment of buffer read procedure for reading one sensed image from a frame buffer.
Figure 26B:
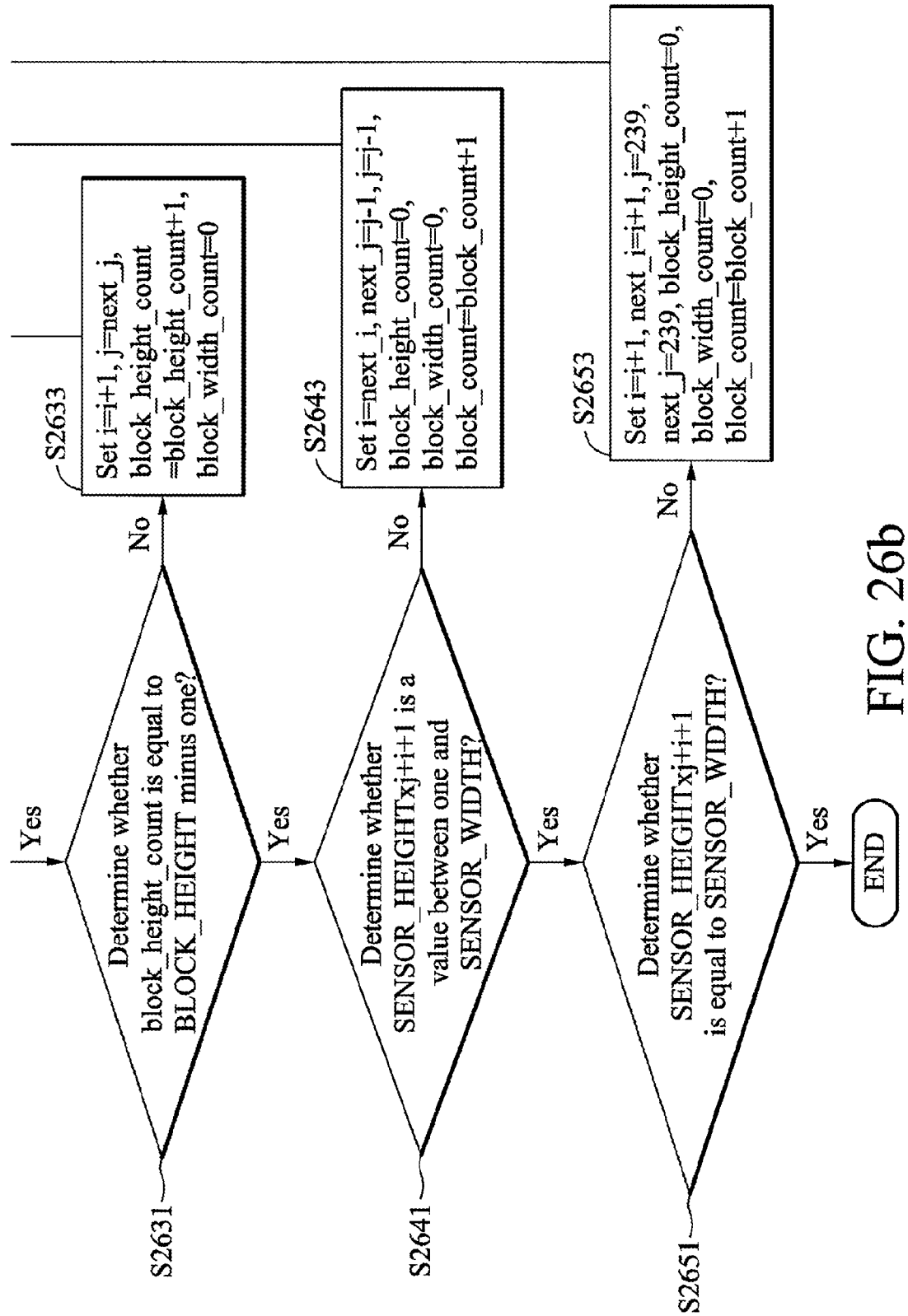

FIG. 26 is a flowchart illustrating an embodiment of buffer read procedure for reading one sensed image from a frame buffer when at least one short edge of an image sensor of a mobile electronic device is placed parallel to at least one short edge of a mobile electronic device as shown in FIG. 7b, and the rotation type is six. The buffer read procedure organizes the image in the frame buffer into blocks according to the rotation type, and performs a series of encoding methods for each block, such as color space transform, down-sampling, discrete cosine transform (DCT), quantization, variable length encoding (VLE), entropy encoding, motion estimation, and/or others. In step S2611, variables i, next_i, block_count, block_height_count, and block_width_count are initially set to zeros, and variables j, and next_j are initially set to 239. In step S2621, color values for one pixel are read from Buffer[OFFSET+SENSOR_HEIGHT×j+i] and treated as one pixel of a block, denoted as block[block_count,block_height_count,block_width_count], where the constant "OFFSET" indicates the beginning address of the frame buffer 1930, and the constant "SENSOR_HEIGHT" indicates the height of the image sensor 1309. In step S2623, it is determined whether the variable block_width_count is equal to a constant "BLOCK_WIDTH" minus one, where the constant "BLOCK_WIDTH" indicates a block width. If so, the process completes one row of a block and proceeds to step S2631, otherwise, to step S2625. In step S2625, the variable j is decreased by one, and the variable block_width_count is increased by one. In step S2631, it is determined whether the variable block_height_count is equal to a constant "BLOCK_HEIGHT" minus one, where the constant "BLOCK_HEIGHT" indicates a block height. If so, the process completes all rows of a block and proceeds to step S2641, otherwise, to step S2633. In step S2633, the variable i is increased by one, the variable j is set to the variable next_j, the variable block_height_count is increased by one, and the variable block_width_count is set to zero. In step S2541, it is determined whether value of SENSOR_HEIGHT×j+i+1 is a value between one and the constant "SENSOR_WIDTH". If so, the process completes all rows of a slice and proceeds to step S2651, otherwise, to step S2643. In step S2643, the variable i is set to the variable next_i, the variable next_j is set to the variable j minus one, the variable j is decreased by one, the variables block_height_count and block_width_count are set to zero, and the variable block_count is increased by one. In step S2651, it is determined whether value of SENSOR_HEIGHT×j+i+1 is equal to the constant "SENSOR_WIDTH". If so, the process ends to complete a sensed image, otherwise, to step S2653. In step S2653, the variable i is increased by one, the variable next_i is set to the variable i plus one, the variables j and next_j are set to 239, the variables block_width_count and block_height_count are set to zeros, and the variable block_count is increased by one. In step S2645, the newly acquired block denoted as block[block_count] is encoded. Note that the sequence of steps S2611 to S2653 is only provided for improved understanding. Those skilled in the art may arrange functions of S2611 to S2653 in parallel hardware circuits without departing from the scope and spirit of the buffer read procedure in order to improve decoding efficiency.

Figure 27:
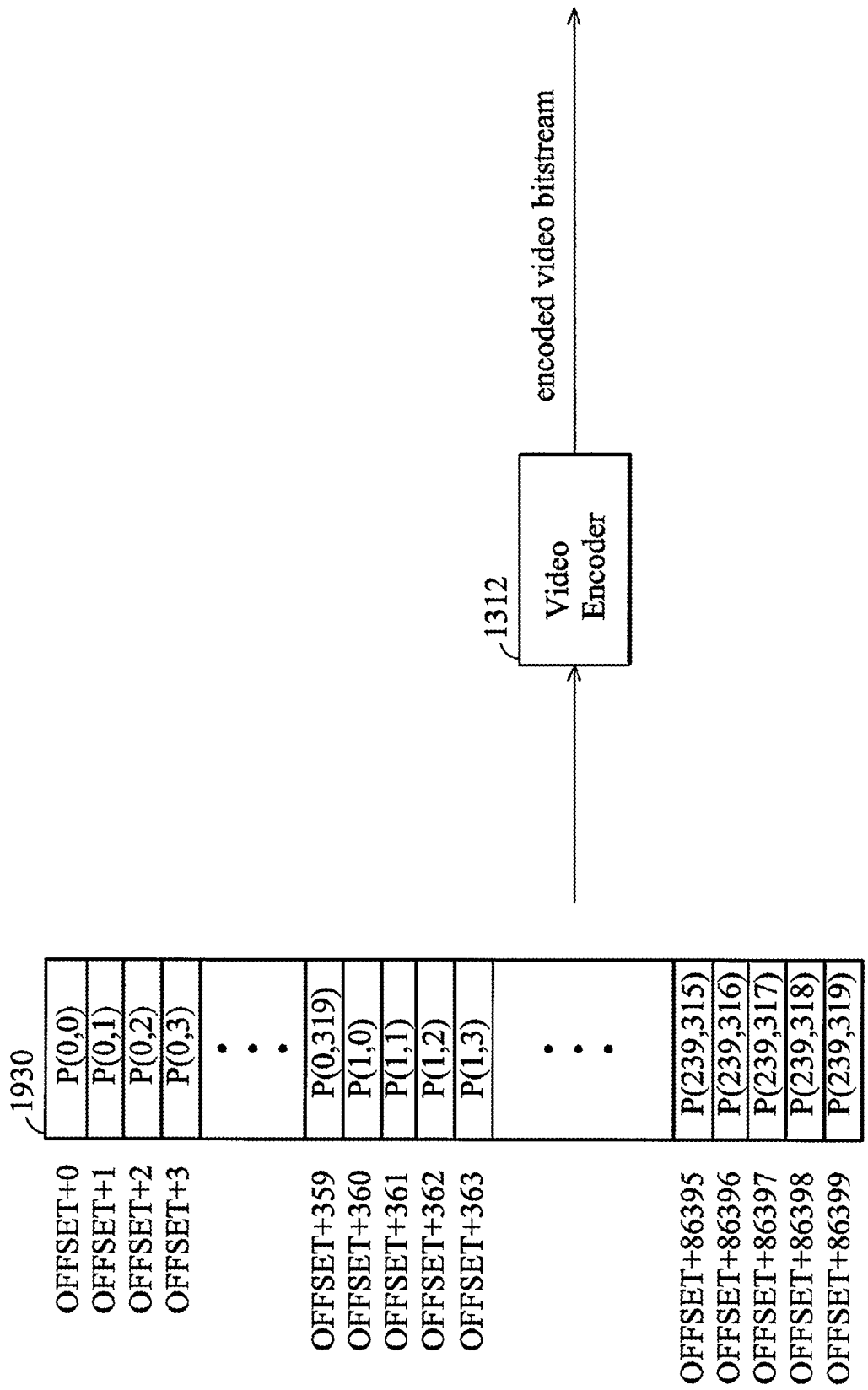
FIG. 27 is a diagram of a video encoder reading pixel values of one sensed image from a frame buffer and generating encoded video stream.

FIG. 27 is a diagram of a video encoder reading pixel values of one sensed image from a frame buffer and generating encoded video stream. Note that, when employing the buffer read procedure as shown in FIG. 25, the organization of blocks is based on the original image. Alternatively, when employing the buffer read procedure as shown in FIG. 26, the organization of blocks is based on a rotated image with reference to FIG. 10f.

Figure 28:
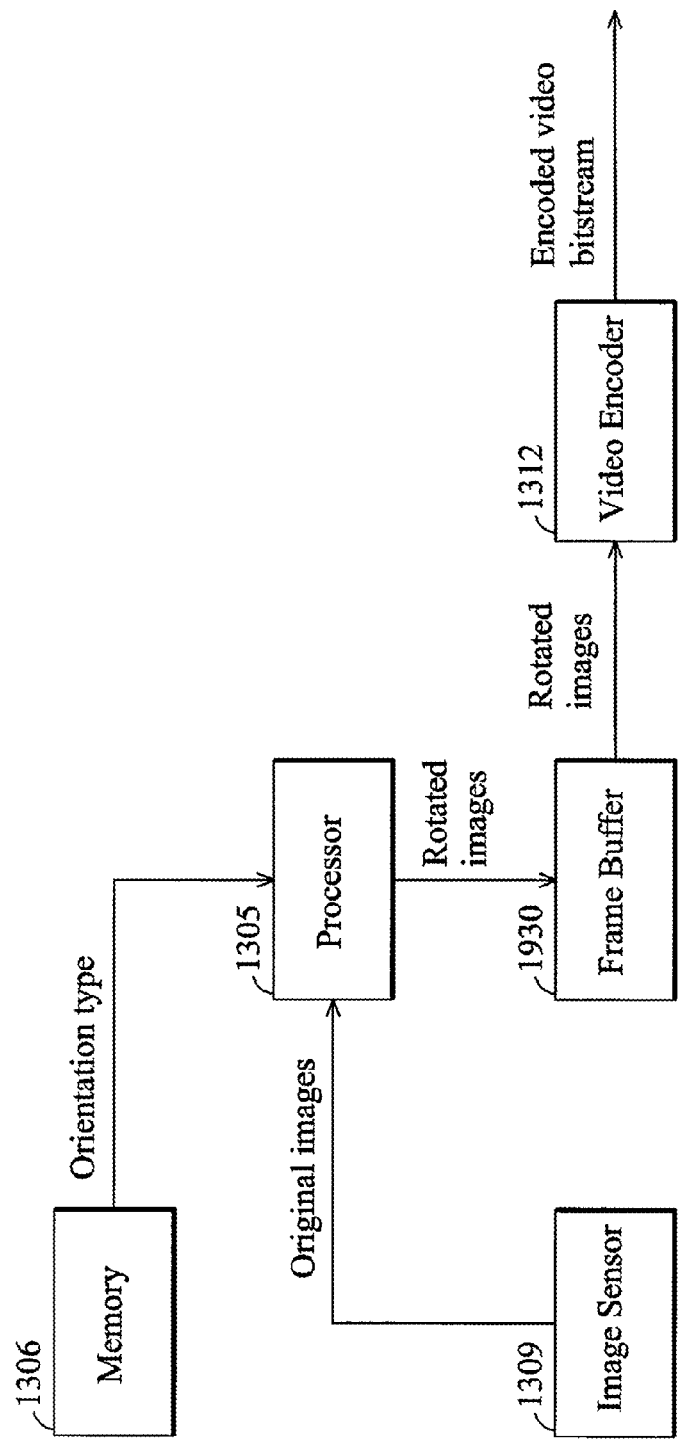
FIGS. 28 and 29 are diagrams of embodiments of pipelines for video encoding.

FIG. 28 is a diagram of an embodiment of a pipeline for video encoding. The pipeline for video encoding comprising the processor 1305, memory 1306, image sensor 1309, video encoder 1312, and a frame buffer 1930 preferably resident on the memory 1306. During video encoding, the processor 1305 receives color values of pixels along the described scanning process from the image sensor 1309 and writes the received color values of each pixel to the frame buffer 1930 with reference to one buffer write procedure implemented in program codes according to a determined orientation type. Details of buffer write procedure may follow the descriptions of FIGS. 20 and 22. When employing the buffer write procedure, the sensed image may be rotated and stored in the frame buffer 1930. The video encoder 1312 subsequently acquires an image by serially reading color values from the frame buffer 1312, and encodes the acquired image into a video bitstream by performing MPEG, H.26x encoding methods, or similar.

Figure 29:
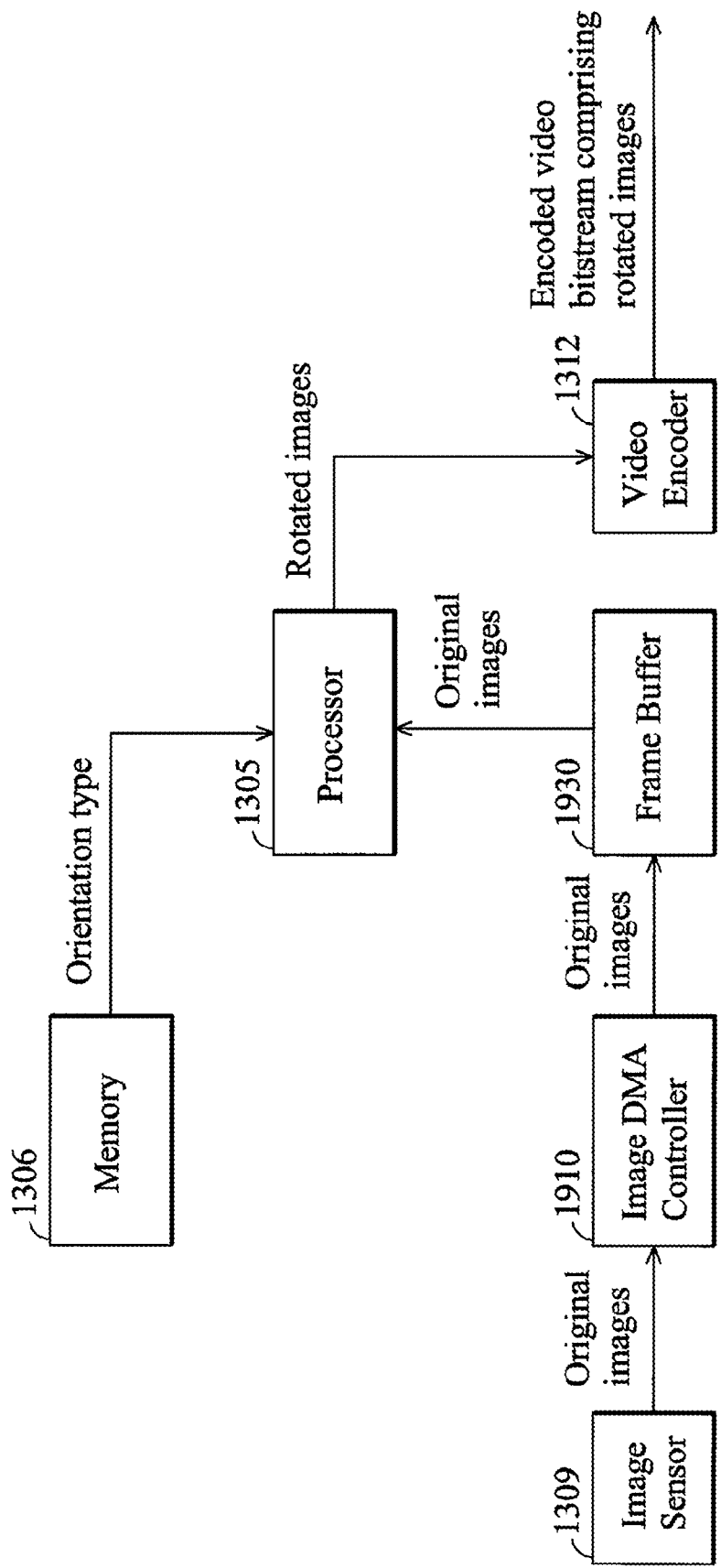

FIG. 29 is a diagram of an embodiment of a pipeline for video encoding. The pipeline for video encoding comprising the processor 1305, memory 1306, image sensor 1309, video encoder 1312, the image DMA controller 1910 preferably resident on the sensor controller and image processor 1310, and the frame buffer 1930 preferably resident on the memory 1306. During video encoding, the image DMA controller 1910 receives color values of pixels along the described scanning process from the image sensor 1309 and writes the received color values of each pixel to the frame buffer 1930 from the beginning to the end. The processor 1305 acquires an image by reading color values from the frame buffer 1312 with reference to one buffer read procedure implemented in program codes according to a determined orientation type. Details of buffer read procedure may follow the descriptions of FIGS. 25 and 26. Note that, steps S2545 and S2645 are updated with outputting the newly acquired block denoted as block[block_count] to the video encoder 1312. When employing the buffer read procedure, the sensed image may be rotated and outputted to the video encoder 1312. Thereafter, The video encoder 1312 subsequently, and encodes the acquired image into a video bitstream by performing MPEG, H.26x encoding methods, or similar.

Methods for capturing and displaying images of objects, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a mobile phone, a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a mobile phone, a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention.

Therefore, the scope of the invention shall be defined and protected by the following claims and their equivalents.

What is claimed is:

1. A method for generating an image object, performed by an electronic device comprising a plurality of shutter objects for capturing images upon activation, each of the plurality of shutter objects corresponding to an orientation type, comprising:
    detecting a signal generated by one of the plurality of the shutter objects;
    determining an orientation type according to the shutter object generating the signal; and
    storing the orientation type and rotating the image object according to the determined orientation type.

2. The method as claimed in claim 1 further providing information indicating mapping relationships between shutter objects and orientation types, and the orientation type is determined according to the shutter object generating the signal and the information.

3. The method as claimed in claim 2 wherein the information is provided according to placement of an image sensor located in the electronic apparatus.

4. The method as claimed in claim 1 wherein the determined orientation type is stored in an orientation tag of a still image header file compatible with the exchangeable image file format (EXIF).

5. The method as claimed in claim 1 wherein the determined orientation type is stored in a user data box of an MPEG file.

6. The method as claimed in claim 1 wherein the determined orientation type indicates one of the following representation situations:
    row 0 of the stored image object is displayed at the top and column 0 of the stored image object is displayed at the left-hand side;
    row 0 of the stored image object is displayed at the top and column 0 of the stored image object is displayed at the right-hand side;
    row 0 of the stored image object is displayed at the bottom and column 0 of the stored image object is displayed at the right-hand side;
    row 0 of the stored image object is displayed at the bottom and column 0 of the stored image object is displayed at the left-hand side;
    row 0 of the stored image object is displayed at the left-hand side and column 0 of the stored image object is displayed at the top;
    row 0 of the stored image object is displayed at the right-hand side and column 0 of the stored image object is displayed at the top;
    row 0 of the stored image object is displayed at the right-hand side and column 0 of the stored image object is displayed at the bottom; and
    row 0 of the stored image object is displayed at the left-hand side and column 0 of the stored image object is displayed at the bottom.

7. The method as claimed in claim 1 wherein the image object is to be displayed in response to the stored orientation type.

8. A system for generating an image object, comprising:
    a first shutter object for capturing images upon activation;
    a second shutter object for capturing images upon activation; and
    a processor coupling to the first and second shutter objects, detecting a signal, determining whether the signal is generated by the first shutter object or the second shutter object, determining a first orientation type when the signal is generated by the first shutter object, determining a second orientation type when the signal is generated by the second shutter object, storing the image object with the determined orientation type and rotating the image object according to the determined orientation type,
    wherein the image object is to be displayed in response to the stored orientation type.

9. The system as claimed in claim 8 wherein the processor provides mapping relationships indicating that the first shutter object corresponds to the first orientation type and the second shutter object corresponds to the second orientation type.

10. The system as claimed in claim 9 wherein the first orientation type or the second orientation type is determined according to the provided mapping relationships.

11. The system as claimed in claim 8 further comprising a front panel and a lateral side, wherein a hard shutter key is placed at a keypad disposed on the front panel, a shutter button is disposed on the lateral side, at least one soft key is displayed on a touch panel disposed on the front panel, and the first and second shutter objects are any combination of the hard shutter key, the shutter button, and the at least one soft key.

12. The system as claimed in claim 8 wherein the determined orientation type is stored in an orientation tag of a still image header file compatible with the exchangeable image file format (EXIF).

13. The system as claimed in claim 8 wherein the determined orientation type is stored in a user data box of a MPEG file.

14. The system as claimed in claim 8 wherein the determined orientation type indicates one of the following representation situations:
    row 0 of the stored image object is displayed at the top and column 0 of the stored image object is displayed at the left-hand side;
    row 0 of the stored image object is displayed at the top and column 0 of the stored image object is displayed at the right-hand side;
    row 0 of the stored image object is displayed at the bottom and column 0 of the stored image object is displayed at the right-hand side;
    row 0 of the stored image object is displayed at the bottom and column 0 of the stored image object is displayed at the left-hand side;
    row 0 of the stored image object is displayed at the left-hand side and column 0 of the stored image object is displayed at the top;
    row 0 of the stored image object is displayed at the right-hand side and column 0 of the stored image object is displayed at the top;
    row 0 of the stored image object is displayed at the right-hand side and column 0 of the stored image object is displayed at the bottom; and
    row 0 of the stored image object is displayed at the left-hand side and column 0 of the stored image object is displayed at the bottom.

* * * * *